Sept. 14, 1965      E. R. PETERSON      3,206,042
MULTIPLE SHEET HANDLING DEVICE
Filed April 17, 1963      12 Sheets-Sheet 1

INVENTOR.
ERIC RONALD PETERSON
BY  *Leonard H. King*
ATTORNEY

Sept. 14, 1965  E. R. PETERSON  3,206,042
MULTIPLE SHEET HANDLING DEVICE
Filed April 17, 1963  12 Sheets-Sheet 4

INVENTOR
ERIC RONALD PETERSON
BY Leonard H. King
ATTORNEY

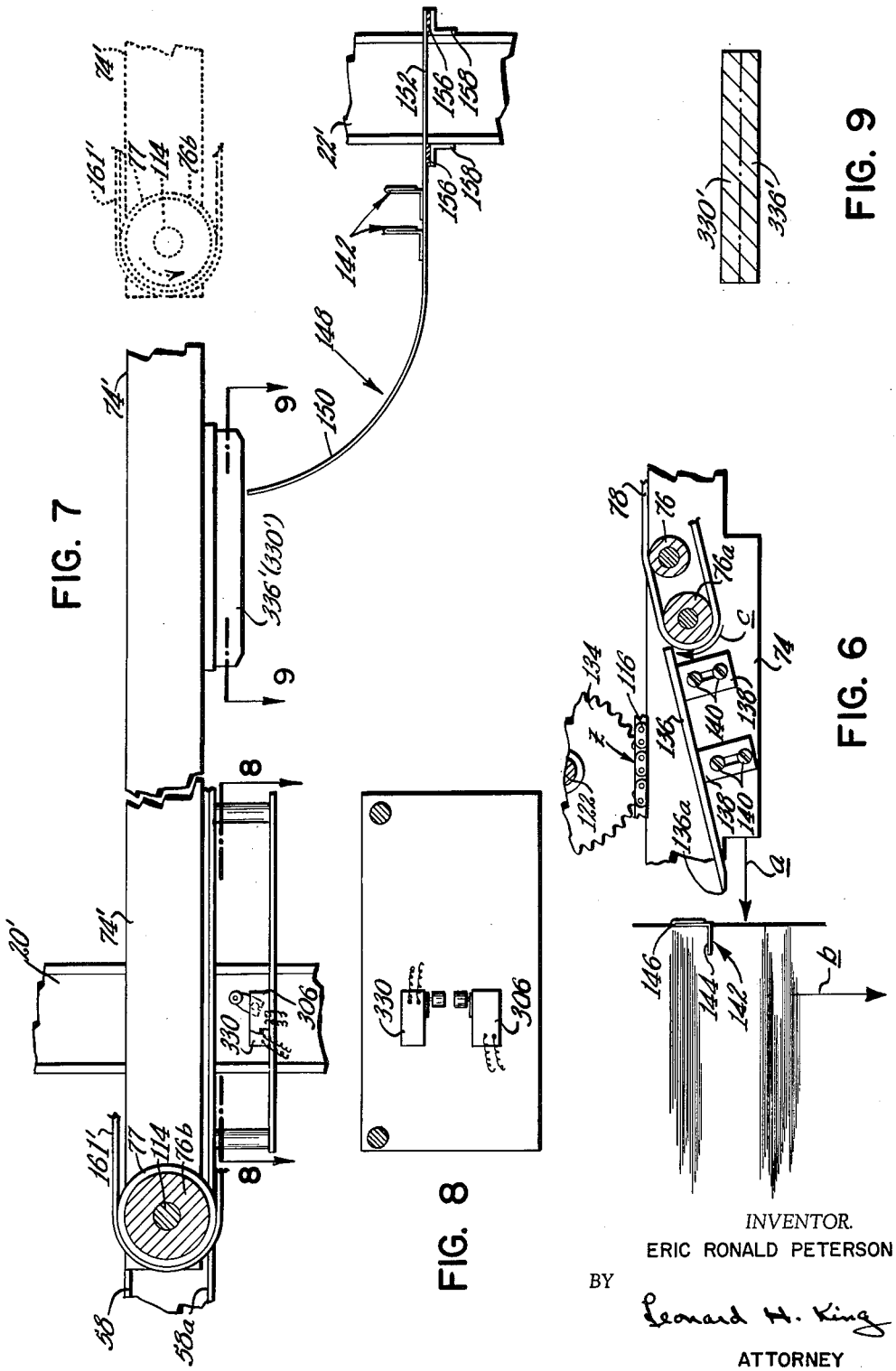

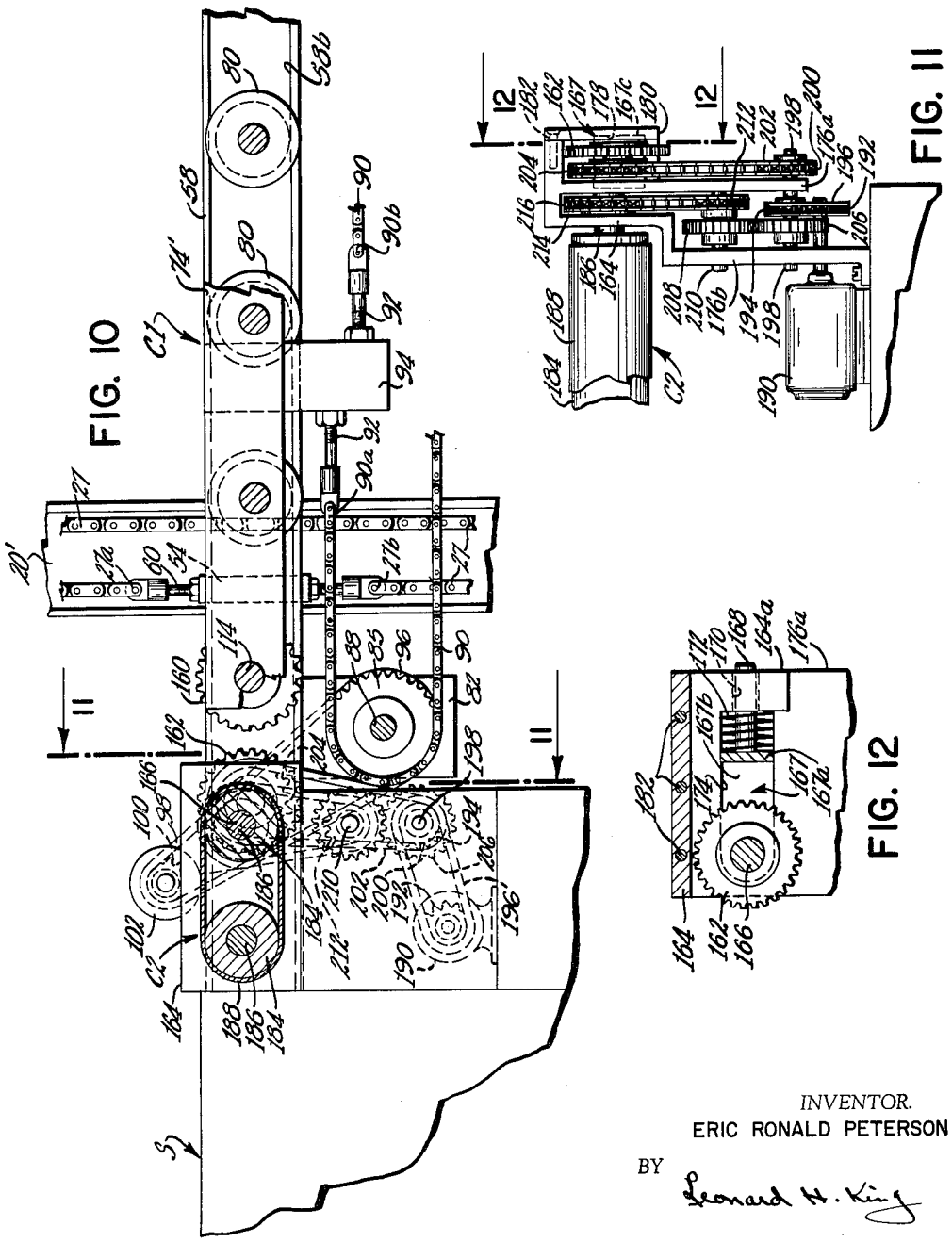

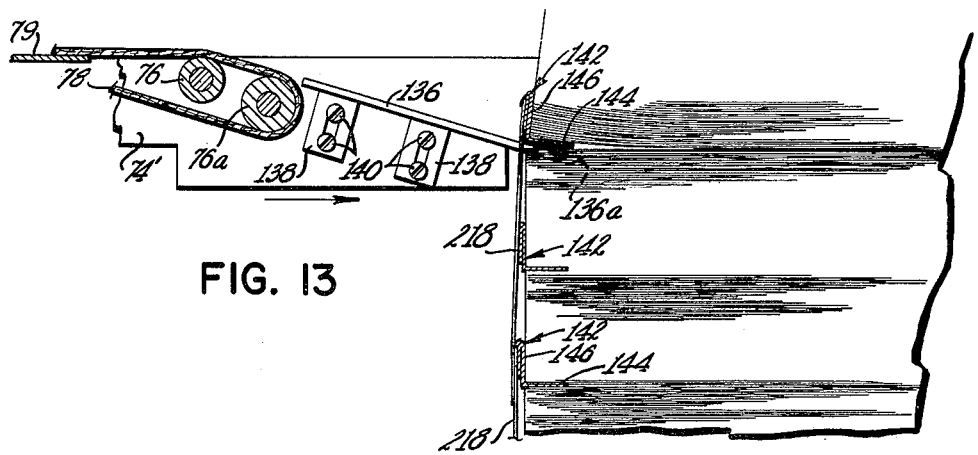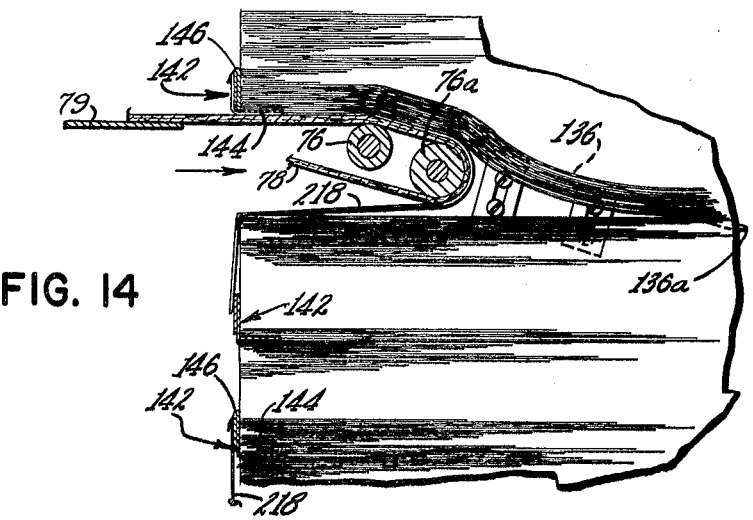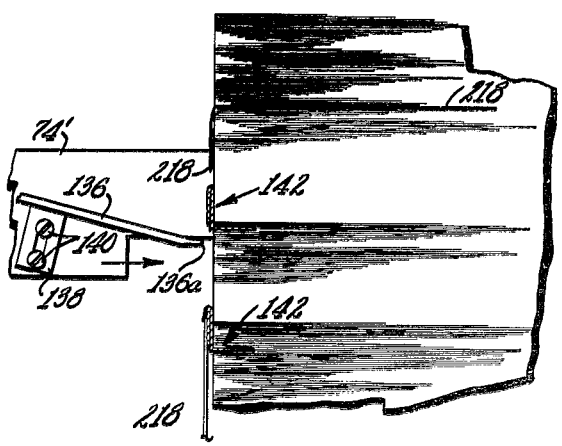

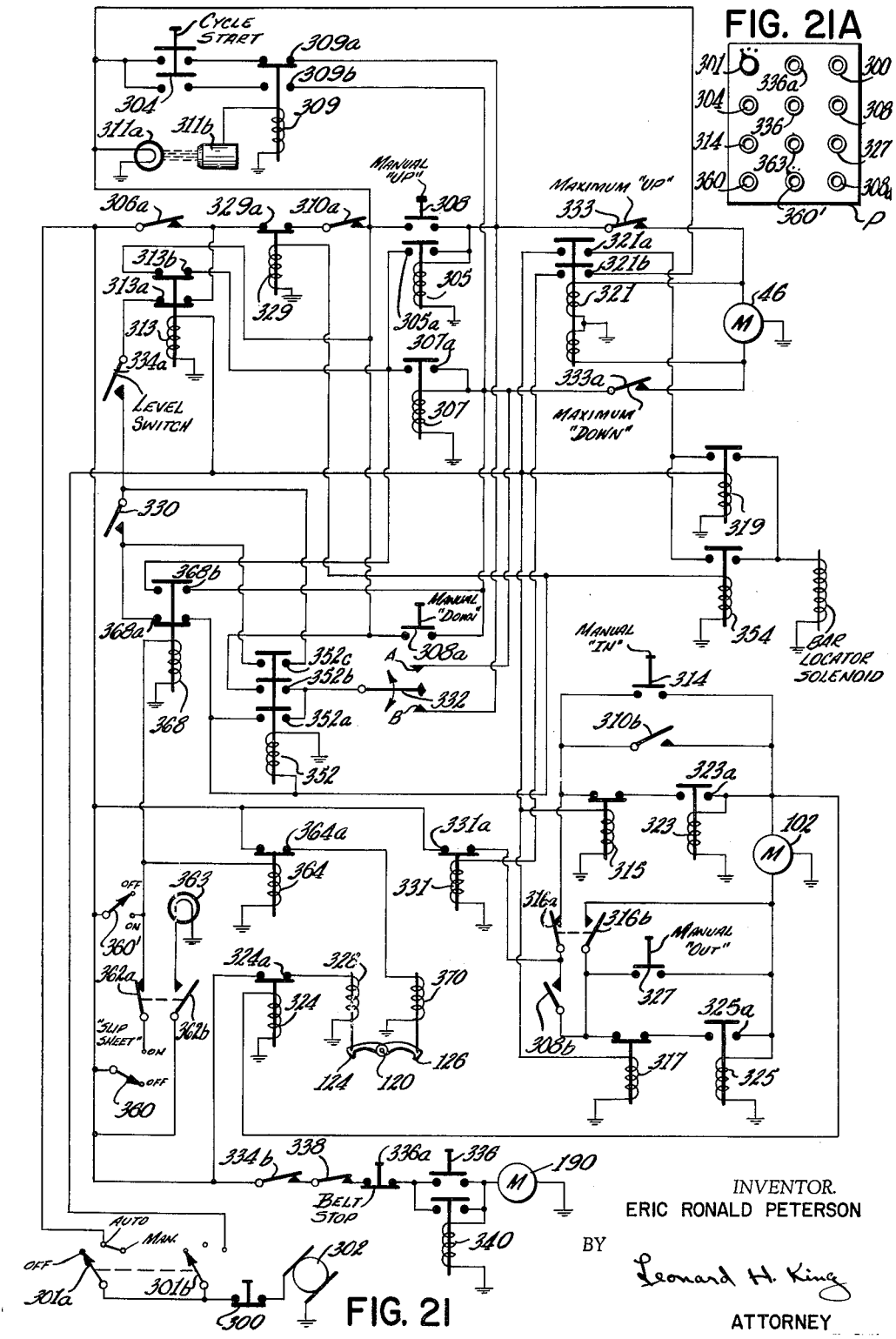

Sept. 14, 1965 E. R. PETERSON 3,206,042
MULTIPLE SHEET HANDLING DEVICE
Filed April 17, 1963 12 Sheets-Sheet 10
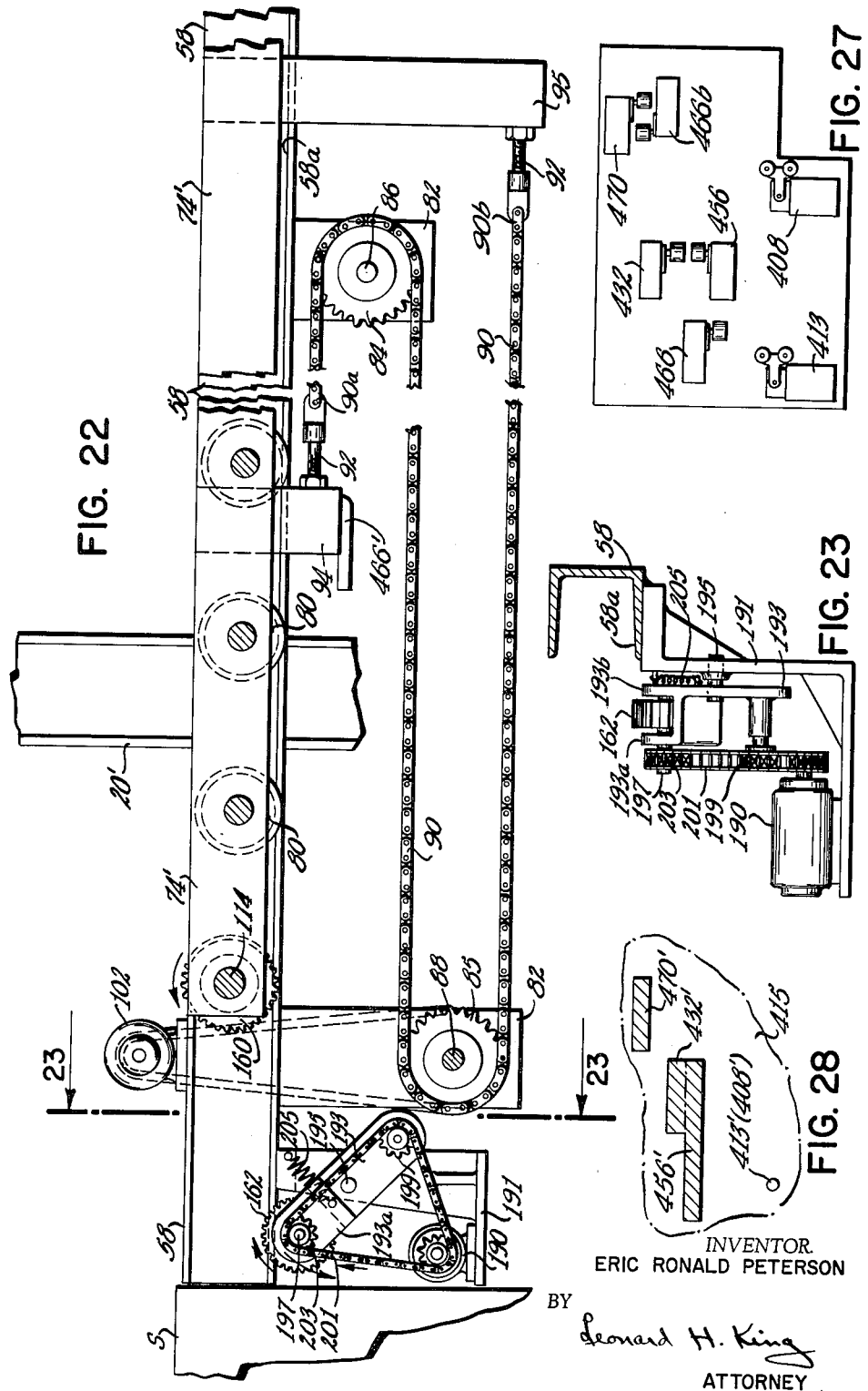
INVENTOR.
ERIC RONALD PETERSON
BY
Leonard H. King
ATTORNEY Sept. 14, 1965  E. R. PETERSON  3,206,042
MULTIPLE SHEET HANDLING DEVICE
Filed April 17, 1963  12 Sheets-Sheet 11

INVENTOR.
ERIC RONALD PETERSON
BY
Leonard H. King
ATTORNEY

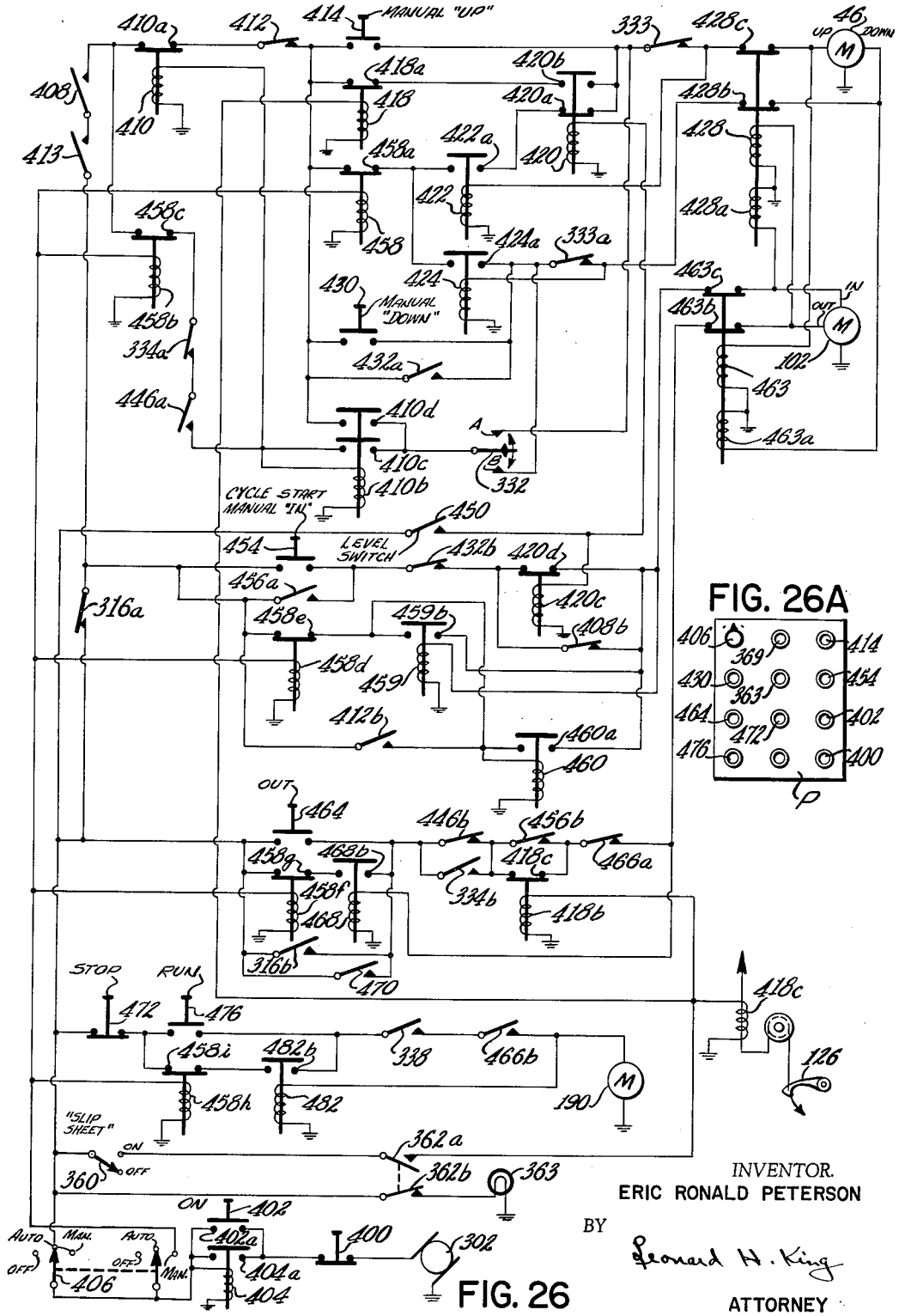

United States Patent Office 3,206,042
Patented Sept. 14, 1965

3,206,042
MULTIPLE SHEET HANDLING DEVICE
Eric Ronald Peterson, New York, N.Y.
(83 Miller St., Staten Island, N.Y.)
Filed Apr. 17, 1963, Ser. No. 276,116
16 Claims. (Cl. 214—8.5)

This invention relates to sheet-handling devices and in particular to means for automatically transferring a stack of paper sheets from a pallet load to a utilization apparatus.

At the paper mill, the paper is generally made on a continuous basis in the form of a strip. The strip width would depend on the machine size, widths of 60 to 80 inches being common. While certain types of paper, such as newsprint, is delivered to the user in the form of rolls, much of it is cut into flat sheets. Thus, at the mill, the first layup may be of sheets 80 inches by 100 inches which are then stacked and fed into a paper cutter and reduced to a smaller sheet size, typically, 53 inches by 78 inches, which are stacked on a pallet or skid to a height of say, 36 inches or a skid load of about 4000 pounds. The paper house receiving the skid load may, in turn, cut the paper sheets again to a smaller size for shipment to the printer or the printing plant may cut its own sheet.

Generally, a stack about 6 inches high is cut in a standard cutting machine. A 53" x 78" x 6" stack weighs about 650 pounds. In addition, the handling of such stacks is a difficult matter since the paper has the characteristic of being flexible.

Thus, a need exists for paper handling machinery. Major shortcomings in prior art equipment fall into several separate categories which are responsible to a large degree for excessive manufacturing costs, wastage and/or spoilage. First, a large number of manual operations were required in the prior art to complete a loading, cutting and removal cycle. Consequently, the success of the system depended on the skill and abilities of the machine operator. This in turn affected the quality of the end product since stacks of paper subjected to excessive handling are liable to sustain damage merely because of their physical dimensions. It is virtually impossible to handle bundles with the extraordinary weight of paper without curling or bending at least the top and bottom-most sheets. At best because of the smooth, slippery surface characteristics of most paper stock, even the most careful manual manipulation will result in some distortion or misalignment of the stack height from a truly squared up configuration. Coincident with the deleterious effect on the paper stock resulting from manual operations are the harmful physical and mental demands made on operating personnel. The physical demands alone are tremendous because of the size and weight of the material being handled. When it is necessary to transport large loads such as these, as by lifting, sliding, pushing, or the like, the incidence of fatigue is greatly amplified. The net result is a sharp drop-off in efficiency and quality, as well as an increase in the always present danger of industrial accidents. In addition, the mental demands are excessive even for a person with many years experience with a particular machine or operation.

Broadly stated, a second major weakness in many types of prior art equipment resides in the mode of operation, whether it be fully or semi-automatic. By composition, the material under consideration, paper sheets, require delicate handling so that they are not soiled or marred and so that they reach the cutting area in perfect condition. The stock must be carefully picked up and delivered to the utilization device with a minimum of handling and in such a manner as to assure a high quality end product. In addition, another limitation in many prior art devices is the use of expensive and complicated elevators to raise and lower the loaded skid to the conveyor and cutting level. This adds to the expense of the installation and also reduces the flexibility of the system by requiring a well to be cut in the floor to accommodate the elevator. In many instances this prevents the installation of the prior art equipment. Also, the motion of the elevator, or in fact any motion at all imparted to the skid of paper, tends to dislodge the paper to some degree and increase the probability of later malfunction. Due in part to both the nature and number of operations in a complete cycle, such as depositing the loaded skid, unloading a quantity of paper, conveying said paper to the cutter, then cutting and removing said paper, it was frequently required to have several people operate a single machine.

In order to overcome at least these very obvious defects in the prior art, it is therefore necessary to remove from the operator's responsibility the physical programming of the required steps and to automate, as much as possible, the sequence of operations. To further advance the art, it is imperative to provide a work area free and clear of obstacles so that the mobility and flexibility of the operator is not reduced. By providing an accessible surrounding area, devoid of both material waiting to be worked on and also cooperating supply implements, the operator is free to devote his time and energies to the more important aspect of controlling the system. In addition, the machine control means must be conveniently located so that all phases of the cycle may be kept under constant surveillance. The obvious benefit is a reduction of the operator fatigue inherent in high speed manufacture where heavy and awkward-to-handle material is involved. Logically, a second benefit will accrue and that is a less expensive and more precise end product. Also, a primary consideration in system design improvement is the provision of machine elements capable, both individually and in combination, of providing smooth transport of paper stacks from a standing skid to a cutter, and then removal from same. In addition, these machine elements must perform their assigned functions with the barest minimum of contact with the material being worked on.

In view of the foregoing, it is therefore an object of this invention to provide a high speed paper pile feeding system that is substantially automatic.

It is another object to provide paper stack conveying means requiring a minimum of contact with the stock being so transported.

A further object is to provide a paper handling machine having a mobile control center.

An additional object is to provide a system capable of supplying to a utilization device a discrete and predeterminable quantity of stacked sheets.

Still another object is to provide means for selectively indicating the location of individual sheets within the stack.

An important object is to provide a paper pile handling system operable by a single individual.

A further object is to provide a conveyor system adaptable to the configuration of the particular cutting table used therewith.

An object is to provide a completely integrated system for loading, conveying, cutting and removing stacks of paper that incorporates the above objects and is still compatible with existing installations.

A further object is to provide a paper handling apparatus capable of installation without major constructional alterations in existing paper cutting plants.

A further object is to provide a versatile paper handling machine that will automatically perform slip-sheeting operations.

Still another object is to provide a system for handling paper that has an unobstructed approach from at least three sides.

These and other objects and advantages of the present invention will, in part, be pointed out with particularity and will, in part, become apparent from the following more detailed description of the invention, taken in conjunction with the accompanying drawing which forms an integral part thereof.

In the various figures of the drawing, like reference characters designate like parts.

In the drawing:

FIG. 6 is a schematic showing of a particular phase of operation;

FIG. 7 is a fragmentary side elevation illustrating means for spacer bar removal;

FIG. 8 is a view taken along line 8—8 of FIG. 7 illustrating the physical relationship of certain switches actuated during the course of an operating cycle of the moving conveyor;

FIG. 9 is a view taken along line 9—9 of FIG. 7 illustrating the physical relationship of the cams that actuate the switches of FIG. 8;

FIG. 10 is an enlarged fragmentary elevational view, partly in section, of the machine side opposite FIG. 4;

FIG. 11 is an elevational view partly in section taken along line 11—11 of FIG. 10;

FIG. 12 is a sectional view taken along line 12—12 of FIG. 11 showing resilient mounting of shuttle conveyor drive gear;

FIG. 13 is a side elevation illustrating a "slip-sheet" marker attachment;

FIG. 14 is a side elevation showing a "slip-sheet" marker partially inserted;

FIG. 15 is a side elevation illustrating a stack with several "slip-sheet" markers fully inserted;

FIG. 18 is a pictorial detail of a spacer bar;

FIG. 18A is a fragmentary pictorial detail of an alternative spacer bar;

FIG. 19 is a partial side elevation illustrating the shuttle conveyor in operation;

FIG. 20 is a partial plan view illustrating the shuttle conveyor in operation;

FIG. 21 is a circuit diagram illustrating control means for one embodiment of the present invention;

FIG. 21A is a face view of the control panel associated with the circuitry of FIG. 21;

FIG. 22 is an elevational view, similar in location to FIG. 10, of a shuttle conveyor drive system of an alternate embodiment, with certain parts being omitted for clarity;

FIG. 23 is a sectional elevation view taken along line 23—23 of FIG. 22;

FIG. 26 is a circuit diagram illustrating control means for an alternative embodiment of the present invention; and FIG. 26A is a face view of the control panel associated with the circuitry of FIG. 26;

FIG. 27 is a view similar to FIG. 8 illustrating an alternative switch layout; and FIG. 28 is an illustration of the position of the cams which actuate the switches of FIG. 27.

The invention will hereinafter be described in conjunction with skids of paper as may be found in paper handling plants ranging from the mill to the printer. The present invention in the form of either embodiment may be used to advantage where large quantities of paper are handled.

Figure 1:
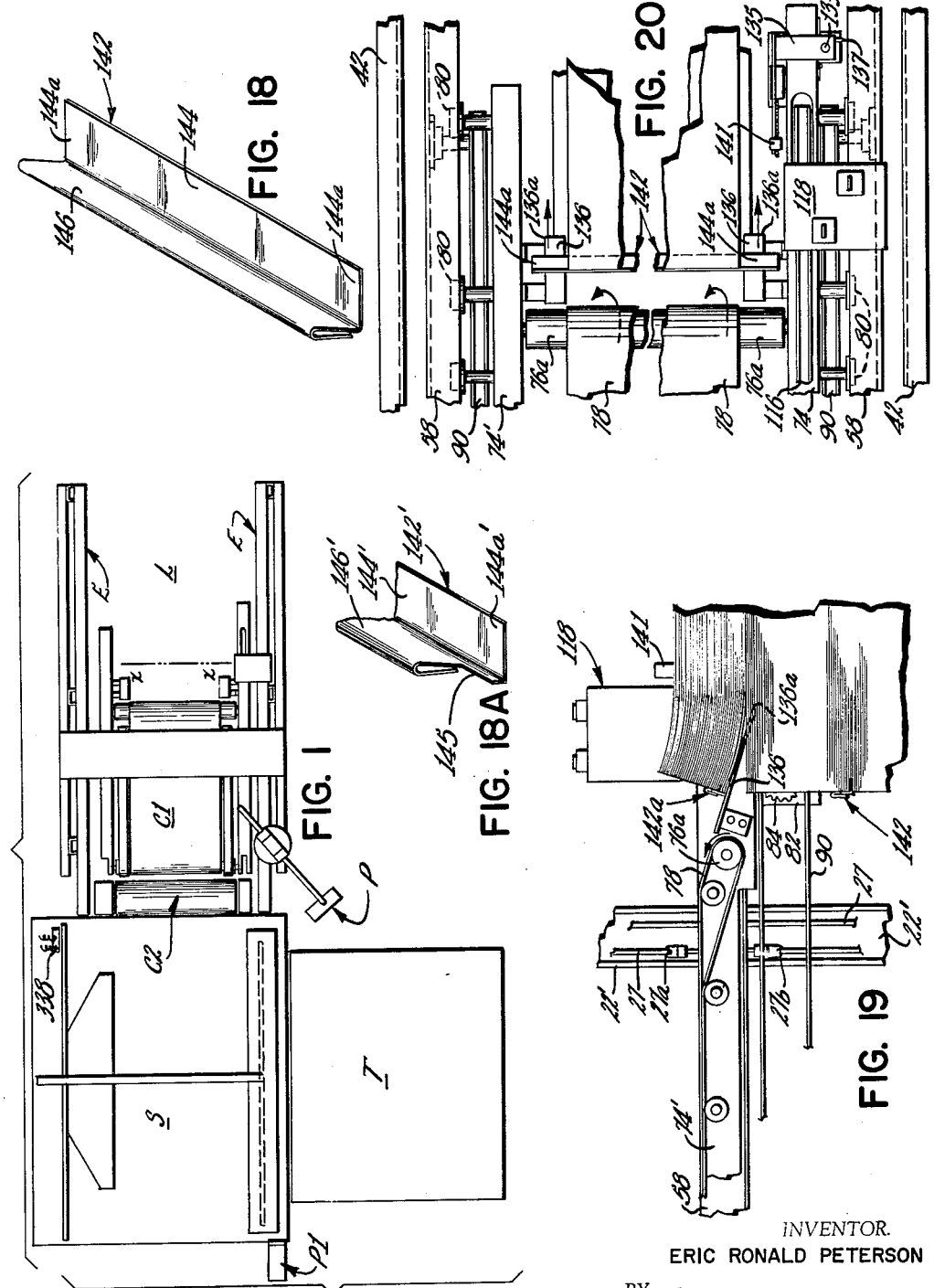
FIG. 1 is a schematic plan view showing the relative positions of loader, shuttle conveyor, fixed conveyor, cutter and takeoff components in a typical installation.

There is fragmentarily shown in FIG. 1 a completely integrated paper handling system comprising a loading area L, elevator E, shuttle conveyor table C1, fixed conveyor C2, and cutter and takeoff means T. This embodiment provides a loading area enclosed on three sides by support structures and machine elements and by shuttle conveyor table C1. The end opposite shuttle conveyor C1 is open to permit delivery and deposit, as by fork lift truck, of skids of paper completely within loading area L.

An advantageous feature of the device is that when the elevator is in a raised position, loaded skids may also be positioned from either side. Thus the device may be employed in even crowded plants where, for example, the apparatus may have to be located near a wall and access must be from the side. In some instances, loaded skids may be lined up for delivery to the loading area and the unrestricted access is necessary to permit the unloaded skid to be removed.

The apparatus of this invention does not require elevator pits which are sunk into the floor nor the use of tracks laid on the floor.

The leading edge of the loaded skid is placed approximately at line $x$—$x$ (FIG. 1) delineated by paint or other suitable markers such as angle irons fixed to the floor such that they serve as stop members for the skid. The placement of the skid need only be approximate since sufficient adjustability is provided the locating switches associated with the various operations of the system. In practice, however, it has been found that accurate placement of the skid is easily obtained when such placement is assisted by anyone of the aforementioned marking means. One important objective achieved is that the skid and its cargo are protected and shielded from normal plant activities. The assemblage hereinafter described and illustrated may be utilized as shown, or may, because of its inherent flexibility, be rearranged to meet exitsing plant conditions and limitations.

Figure 2:
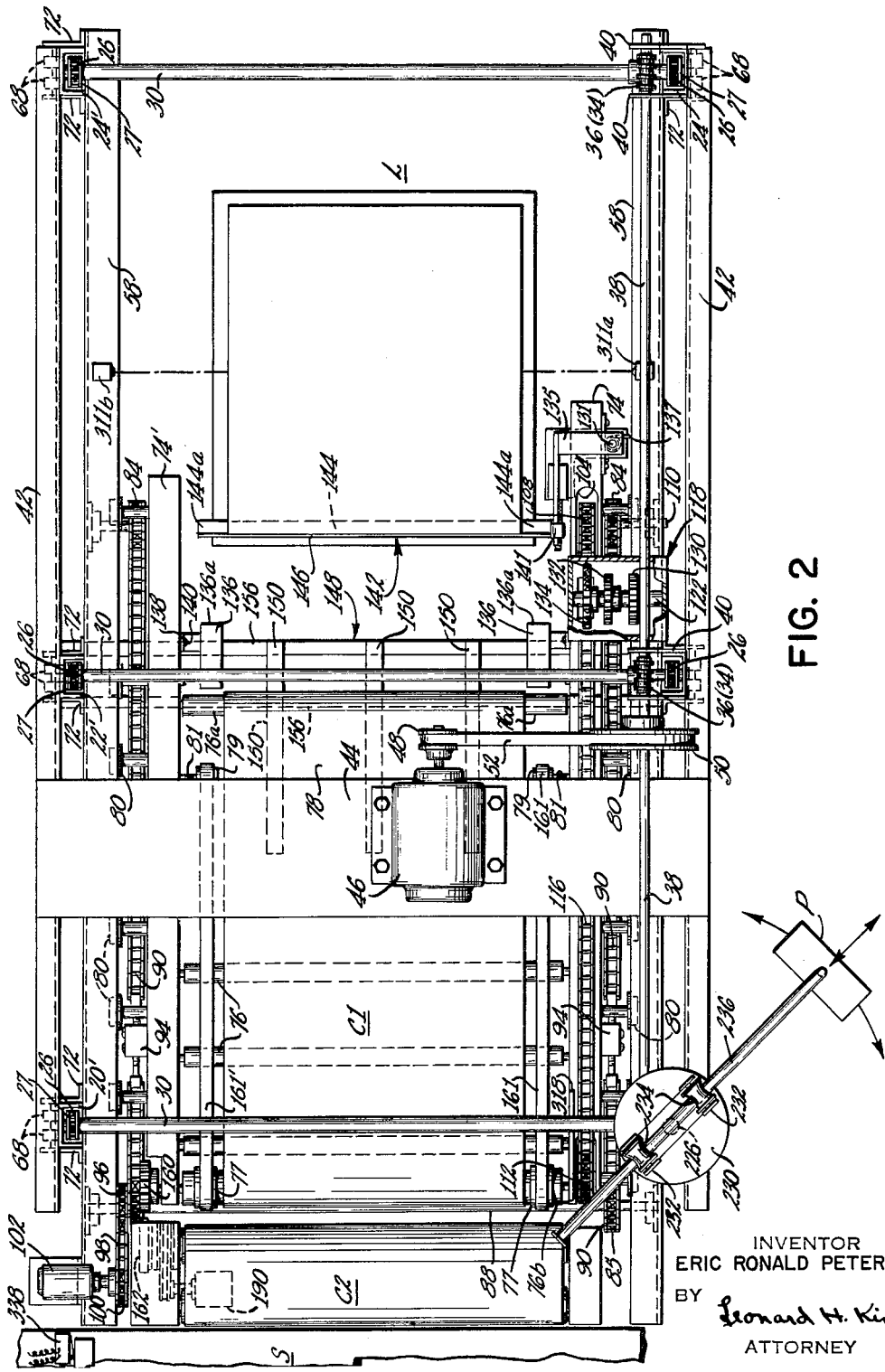
FIG. 2 is a plan view of the combination loader and shuttle conveyor.
Figure 3:
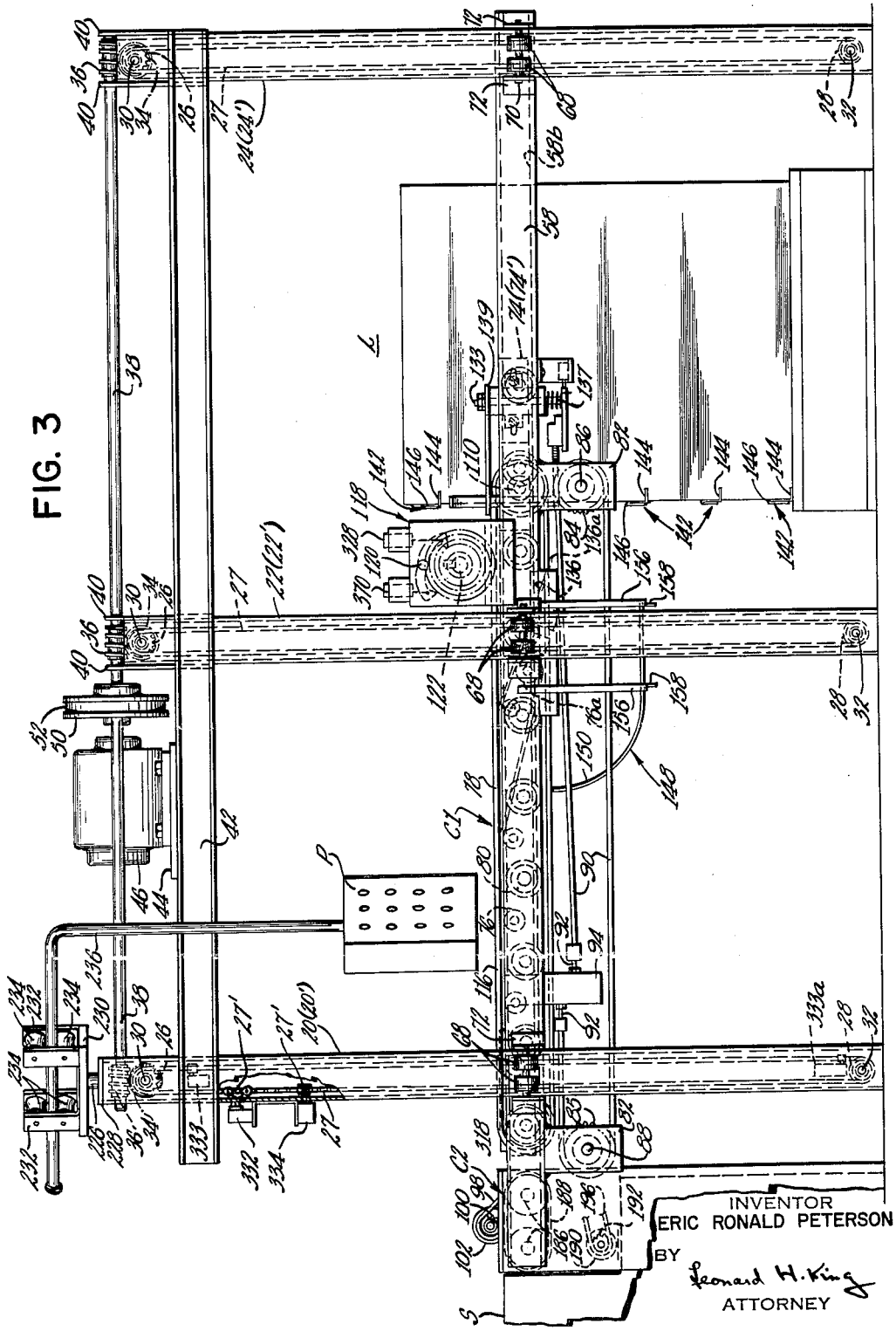
FIG. 3 is a side elevation of the loader and shuttle conveyor of FIG. 2.

As may best be seen in FIG. 2 and FIG. 3, the loading area L and shuttle conveyor table C1 have associated therewith three pairs of vertical support columns 20–20', 22–22', and 24–24' constituting spaced side frames. These columns, rigidly braced in a conventional manner, may be permanently attached to the floor, if so desired. At the inside top and bottom of each column are mounted a pair of sprockets 26 and 28 carried respectively by cross shafts 30 journaled at and extending between the tops of each column, and stub shafts 32 suitably mounted at the bottom of each column. Also mounted on each cross shaft 30, inward of sprockets 26 and proximate columns 20, 22 and 24, is a worm gear 34 adapted to mesh with respective worms 36 suitably secured to drive shaft 38. Brackets 40, rigidly secured to one of a pair of horizontal structural members 42 (which are, in turn, fastened near the tops of columns 20–20', 22–22', and 24–24') maintain shaft 38 in properly spaced relation to assure constant mesh of worm gear 34 and worm 36. Also mounted on members 42 is a platform 44 to which is fastened reversible motor 46. Pulleys 48 and 50, coupled by belt 52, drive shaft 38, worm 36 and worm wheel 34, imparting thereto up and down motion of the elevator in a manner now to be described. It is to be understood that other drive means for moving the elevator up and down are available.

Figures 4, 5:
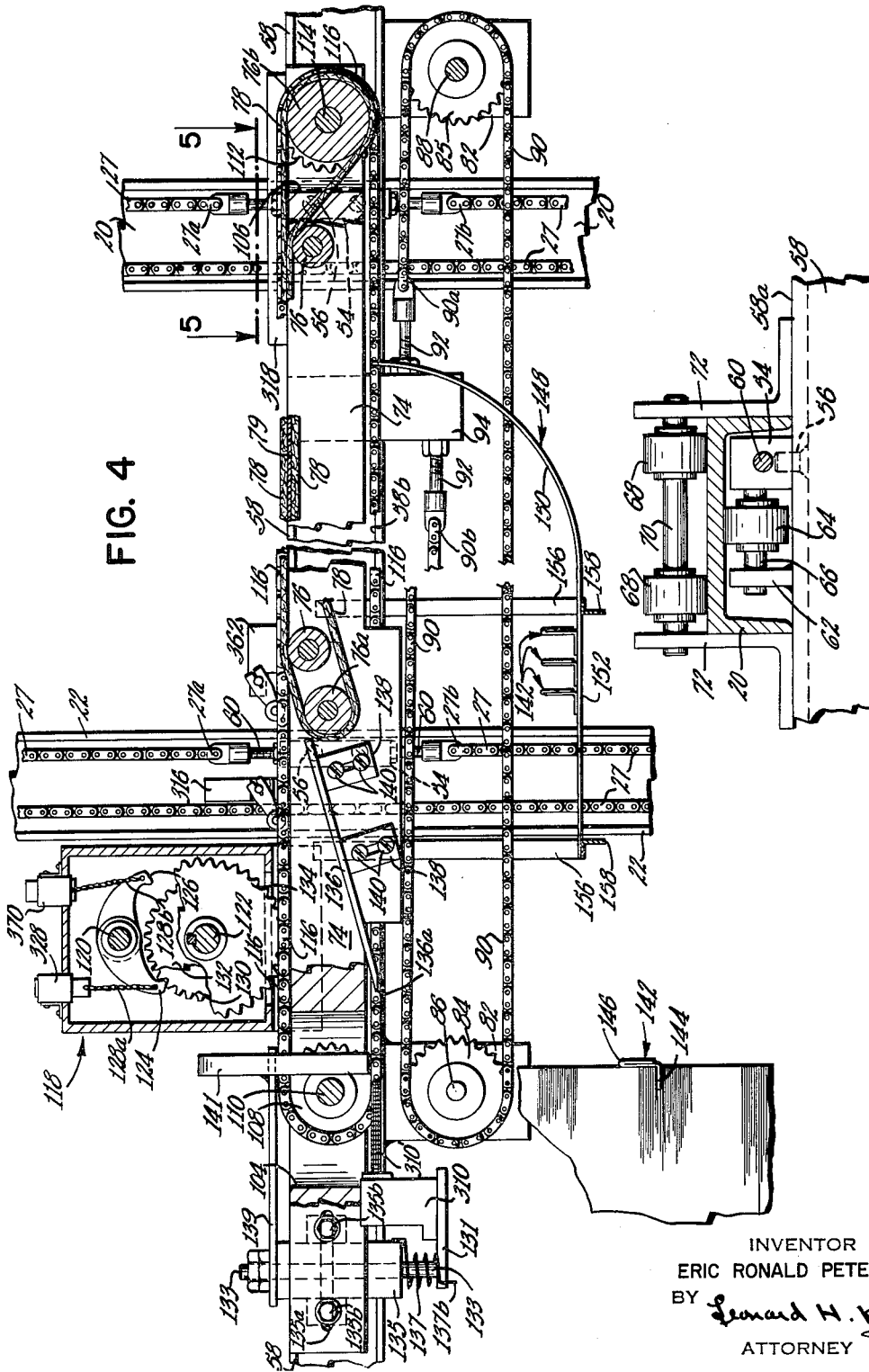
FIG. 4 is an enlarged fragmentary elevational view, partially in section, illustrating suitable shuttle conveyor drive means.
FIG. 5 is a sectional plan view taken along line 5—5 of FIG. 4.

Link chains 27, trained about sprockets 26 and 28, terminate in blocks 54 secured by screw 56 to a pair of spaced, horizontal elevator frame members 58 in the form of U-shaped channels (FIG. 5). Specifically, block 54 is attached to the connecting leg 58a of channel 58 at a point between the spaced legs of each vertical support column and is provided on its top and bottom surfaces with threaded studs 60 adapted to join with the end links 27a and 27b of chain 27. Chains 27 are discontinuous, having ends secured at points above and below horizontal elevator frame members 58. It is readily seen that a simple inexpensive and efficient elevator means E has been provided, the raising and lowering of which, depending on the direction of rotation of motor 46. Also mounted on connecting leg 58a, between the spaced legs of each vertical support column, is a bracket 62. Guide roller 64, rotatably mounted on a shaft 66 which is journaled in both block 54 and bracket 62, is adapted to rollably engage the inside surface of each vertical support column connecting leg. Further, guide means are provided by a pair of rollers 68 rotatably mounted on shaft 70. Angle brackets 72, secured to connecting leg 58a, provide mounting means for shaft 70 so that rollers 68 are in rolling engagement with the outside surface of each vertical support column connecting leg. The provision of vertical support columns in cooperation with the sets of rollers previously described assures smooth, trouble-free elevator motion and contributes to the efficient and accurate operation of the entire system since even the slightest deviation from smooth, level travel may easily disrupt the stack of paper being conveyed and result in uneven, erratic cutting at a latter stage.

The aforementioned elevator, in addition to the components affecting vertical travel, is provided with novel means for imparting transverse travel to shuttle conveyor table C1, slidably mounted therein. Shuttle conveyor table C1 comprises, in part, a pair of frame members 74–74' spaced somewhat closer together than and parallel to elevator channels 58, as shown in FIG. 2. Along the length of frame members 74–74', and mounted therebetween, are a series of rollers 76 around which the endless belt 78 of shuttle conveyor C1 is wrapped in a manner best illustrated in FIGS. 3 and 4. Additionally, frame members 74–74' have projecting outwardly therefrom a series of rotatably mounted wheels 80 adapted to ride on the lower spaced leg 58b of elevator channel 58. Thus, shuttle conveyor C1 is able to rise and fall by the action of elevator E and is also free to be smoothly driven horizontally in two directions within the confines of elevator E.

Secured beneath both lower spaced legs 58b of elevator channels 58 are bearing blocks 82 in which sprockets 84 and 85 are mounted for rotation on stub shafts 86 and cross shaft 88, respectively. Discontinuous chains 90, trained about sprockets 84 and 85, have their end links 90a and 90b pinned to studs 92 threadably engaged in blocks 94 which are, in turn, secured to the outside surface of each conveyor frame member 74–74'.

Bidirectional, horizontal motion is transmitted to chains 90, and therefore conveyor frame 74–74', by cross shaft 88 extending between elevator channels 58 and journaled therein. Sprocket 96, fixed at one outer end of cross shaft 88 is driven by chain 98 through sprocket 100 secured to motor 102. Elevator channel 58, as shown in FIGS. 2, 3 and 10, provides a convenient location for the placement of motor 102.

The mechanisms heretofore described provide for shuttle conveyor C1 an up-down motion as well as a horizontal right-left motion. Still to be considered are means for providing an extension of the horizontal right-left motion, that is, means to carry shuttle conveyor C1 as a body into and out of the stack of paper waiting on the skid within loading area L. Hereinafter "in" and "out" will refer to motion of the conveyor into the stack of paper and out of the stack of paper, respectively. For example, in FIG. 2, shuttle conveyor C1 would move to the right going into the stack and left going out of the stack. The need to transport a metered quantity of paper from one station, the loading area L, to another station S, the cutting table, created the problem of finding means to do this with an absolute minimum of disturbance to the paper. Obviously, the paper must be in contact with the conveyor and rest thereon while being transported. The problem has now been resolved by the provision of a novel conveyor "roll-out" mechanism which, during the approach to the stack of paper, while moving from left to right, causes the conveyor belt to be fed out from underneath. Consider, for the moment, a continuous conveyor belt as comprising two separate, spaced surfaces having a series of rollers therebetween. Also, for purposes of explanation, assume that one particular point on the top conveyor surface is held substantially fixed with respect to some outside stationary point while the conveyor is moved past this point. If this theoretical point is on the top surface, at the right hand end of the conveyor in FIG. 2, then, while the conveyor frame is moved past this point, only the underneath surface of the conveyor will feed out to the right, come over the end roller, to become the top surface. The theoretical point which has been held fixed on top will then appear to be on the left hand end of the conveyor, since the entire conveyor frame has moved to the right as viewed in FIG. 2.

The mechanism designed to accomplish this is simple, inexpensive to manufacture and maintain, and above all highly efficient. The mechanical elements will now be set forth in greater detail while the electrical control means for programming and timing both this feature as well as the system as a whole will be described later.

With reference to FIG. 4, which is a view partly in section taken from within the loading area L and looking outward, it will be seen that conveyor frame 74 is provided at its extremities with slots 104 and 106. Sprocket 108 is mounted on shaft 110 journaled within slot 104 and sprocket 112 is mounted on cross shaft 114 extending between and journaled in spaced conveyor frame members 74–74'. Endless chain 116 engages sprockets 108 and 112 which are adjustably mounted in slots 104 and 106 for the purpose of providing a predetermined amount of tautness to chain 116 and conveyor belt 78. Directly associated with the upper length of chain links 116 is the conveyor "roll-out" assembly 118 rigidly secured to one elevator frame member 58 which is, as previously explained, movable vertically but not horizontally.

Assembly 118, in the embodiment illustrated, comprises an enclosed case having journaled in opposing vertical walls a pair of spaced shafts 120 and 122. Mounted in tandem on upper shaft 120 are a pair of opposed single tooth pawls 124 and 126 having chains 128a and 128b or other suitable linkages affixed at their outer ends. Chains 128a and 128b are operably connected to actuating arms of solenoids 328 and 370, the functions of which will be subsequently described in greater detail and also in conjunction with the electrical control system. Shaft 122, directly below shaft 120, has keyed thereto a pair of ratchet wheels 130 and 132 located such that they are engageable by pawls 124 and 126, and a sprocket 134, one tooth of which is in engagement with endless chain 116. When the conveyor frame member 74 is driven to the left (towards the stack) by motor 102, sprocket 134 will hold in place the single link of chain 116 in which it is engaged by virtue of the fact that sprocket 134 and ratchet wheel 130 are keyed to a common shaft 122 and ratchet wheel is held against rotation by pawl 124, pivotally mounted on shaft 120. Since "roll-out" assembly 118 is fixed to a non-horizontally movable member, elevator frame member 58, and since conveyor frame member 74 is being displaced to the left (FIG. 4) carrying with it sprockets 108 and 112, it will be seen that underside links of chain 116 will roll out in the same direction as conveyor frame motion. On the conveyor "out" motion, sprocket 134 will be allowed to turn freely as chain 116 is carried past it. The mating configuration of ratchet 130 and pawl 124 assures locking of sprocket and ratchet only on the "in" motion and thus permits free turning of sprocket and slipping of ratchet pawl combination on the "out" motion. During both "in" and "out" motion, pawl 124 is in the down position shown in FIG. 4.

Summarizing the operation of the conveyor advance and roll-out system briefly, motor 102 drives sprocket 100, chain 98, sprocket 96, shaft 88, sprockets 85 and chains 90. When thus put in motion, blocks 94, fastened between end links 90a and 90b, cary conveyor frames 74–74' on which are mounted endless chain 116 and endless conveyor belt 78. Trailing roller 76b and sprocket 112, both mounted on shaft 114, have imparted thereto a common direction of motion and rotation. That is, as frame member 74 is transported to the left (FIG. 4) by the counterclockwise motion of chain 90, so will conveyor 78 move to the left and, as the top row of links of chain 116 are restrained from moving by fixed sprocket 134 causing the bottom row of links to move relatively clockwise while being transported, so will the top and bottom surfaces of conveyor belt 78 react.

Two important points should now be stressed. While it was previously stated that a theoretical point on the conveyor belt is held stationary, it should be observed that this is merely the apparent result of holding the top links of the chain in place since conveyor belt 78 and chain 116 have one shaft 114 in common. Secondly, while for all practical purposes, chain 116 and conveyor 78 move in synchronism, an intentional deviation is introduced. Sprocket 112 has a pitch diameter slightly smaller than the diameter of trailing roller 76b resulting in slightly different peripheral speeds and hence different linear speeds of chain 116 (and also the conveyor as a whole since it is carried by the same frame member 74) and any particular point on the belt 78. It has been found that a difference in sprocket pitch diameter and roller diameter sufficient to cause a belt speed-up of 1" per 1' of longitudinal belt displacement will avoid buckling of the bottom sheet as the belt moves into the stack and will also assist in placing the paper on the belt.

FIG. 6 schematically illustrates the effect of the belt speed-up. Conveyor frame member 74 moves to the left, as denoted by arrow $a$, while the waiting stack as a whole is stationary, as denoted by downwardly pointing arrow $b$. However, the belt, even though it is being transported to the left as a unit by the conveyor frame, is actually moving clockwise (arrow $c$) or to the right with respect to frame 74, as it is rolled out and passes over the leading conveyor roller 76a. This is achieved by keying together chain 116 and belt 78 and holding fixed one link of chain 116 (point $z$) by a single tooth of sprocket 134 as hereinbefore described. As the conveyor contacts the stack, the belt engages the bottom of the leading edge of the paper. As the conveyor advances to the left (arrow $a$) the belt 78 is laid under the paper. If belt 78 were to be moved at a slightly slower speed than chain 116, then the effect would be that of a pushing or buckling of the paper. By moving belt 78 slightly faster than chain 116, the first contacted edge of the paper in the stack is given a very slight pulling motion and is thus maintained in its normally "stretched-out" condition. Since normal manufacturing tolerances prohibit an exact match between chain and belt speeds, the inclusion of an intentional difference assures a positive control of the paper during transference from stack to conveyor. It has been found in practice that this speed differential will not disturb the alignment of the bundle being transferred.

It should be noted in FIG. 4, that leading roller 76a is positioned lower than the other rollers 76 thus creating a sloping leading edge on conveyor 78. Associated therewith, and at substantially the same slope angle, are two cam plates 136 having mounting legs 138 depending therefrom and adjustably secured by screws 140 to inside surfaces of conveyor frame members 74–74'. Cams 136 are positioned such that when carried "in" by frame members 74–74', they engage the underside of spacer bar 142 (FIG. 18) causing them to slide up over cams 136 and be deposited on the clockwise rotating and inwardly moving leading edge of shuttle conveyor C1, as shown in FIG. 19 and FIG. 20. The spacer bars, substantially L-shaped, are inserted in the vertical plane along the leading edge of the stack by the operator at predetermined intervals so that one leg is between the leading edge of two adjacent pieces of paper and the other leg abuts the vertical leading plane of the stack. The bars are of sufficient length to extend beyond the opposing side edges of the stack so that they may be engaged and lifted by cam plates 136. The vertical separation between successive spacer bars depends upon the quantity of paper, such as a ream, that is to be cut at one time. The spacer bars therefore provide an effective metering means. Spacer bars 142 have a single thickness horizontal leg 144 to facilitate insertion between two sheets of paper and a double thickness vertical leg 146 designed to resist any sagging tendency at the center of the bar due to the mass of the paper being lifted by the camming action. A material such as steel of 0.064 thickness has been found to be quite satisfactory. A chromium surface finish applied to the bars has been found to be one of many ways for reducing friction and improving the sliding action of end portions 144a over cams 136.

At this point, it would be well to discuss the mechanical functioning of one electrical switch together with its associated components. A more detailed disclosure follows in the course of the FIG. 21 circuit diagram wherein a complete cycle and the interconnection of all electrical components is spelled out. With partciular reference to FIG. 4, switch 310 is shown mounted at one end of plate 131. At the opposite end of plate 131, and at right angles thereto, is a threaded stud 133 passing through a central aperture in mounting block 135 which is maintained in spaced relationship above plate 131. Torsion spring 137 encircles stud 133 between block 135 and plate 131, having one end 137a bearing against block 135, and the other end 137b, bearing against plate 131. Block 135 is secured to the inside surface of conveyor frame member 74 and is provided with horizontal adjustability by means of screws and slot arrangement. Mounted on top of block 135 and secured to rotatable stud 133 by means of lock nuts, is an arm 139 which has welded to its opposite free end a feeler bar 141. When the skid is placed in loading area L, proximate line $x$—$x$, the leading edge of the paper, and hence the spacer bars 142 will be in substantially the same vertical plane as both feeler bar 141 and the spring finger feeler 310' of switch 310. Deviations from this relationship are compensated for by the screw and slot adjustability of block 135, as hereinbefore described. The spring finger feeler 310' of switch 310 is also in substantially the same horizontal plane as leading edge 136a of cam plate 136.

Before starting the machine, the operator visually determines if the spring finger feeler 310' of switch 310 is above or below the level of the topmost spacer bar. The operator then presses the appropriate button on control panel P to drive the conveyor frame towards the topmost spacer bar. This vertical conveyor motion, accomplished by means of the aforementioned elevator system, continues until the spring finger feeler 310' engages the overhanging end portions 144a of the top spacer bar, whereupon the vertical travel is electrically stopped by action of switch 310 and the "in" travel of conveyor belt 78 and frame members 74–74' is started. The above description is applicable where the conveyor frame 74–74', upon which is mounted switch 310, is initially above the topmost spacer bar. When the frame members are below the topmost spacer bar, as may happen when a fully loaded skid is to be worked on, then the feeler bar 141 will engage the end portions 144a of each successively higher spacer bar 144 as the elevator raises the conveyor frame. The feeler bar, in conjunction with torsion spring 137 will pivot switch 310 out of the path of spacer bar end portions 144a until the feeler bar has traveled upwardly past the last bar. At this point torsion spring will return switch 310 to its original position in which it may contact the spacer bar and start the "in" motion of the conveyor.

A particular advantage of this system is the aforementioned method of transferring the metered quantity of paper from the stack to shuttle conveyor C1. As previously noted, the leading edge of the stack is raised by means of end portions 144a of spacer bar 142. In the embodiment illustrated, the total rise over the entire cam length is approximately 1½" to 2". The conveyor belt 78, traveling in and being "rolled out" underneath as previously described, passes beneath the lowermost sheet of paper and above, but not contacting the topmost sheet of paper in the next metered quantity below. The 1½" to 2" rise provided by cams 136 is sufficient to permit this. Thereafter, the leading roller 76a continues inward while "rolling-out" the bottom of conveyor belt so that it is placed progressively inward, under the lowermost sheet of paper. Since the top of the conveyor belt 78 is held almost stationary, traveling only at the minute rate of 1" per 1' of forward motion previously described, the leading edge of paper being transferred finds itself relatively further back along the conveyor belt as the inward travel continues to the opposite end of the stack. For all practical purposes, only the area in the immediate vicinity of the leading conveyor edge is in motion. The rest of the paper being transferred has either been placed on the conveyor belt 78 or is still on the stack awaiting transferral. In either case, the paper is essentially at rest since there is only a very limited sliding contact at any time between conveyor belt 78 and paper. To insure firm support for the paper disposal thereon and also to minimize rubbing a plate 79 is interposed between adjacent layers of belt 78.

It will be appreciated from a study of FIG. 4 that the spacer bar 142 will be picked up at its ends 144a by the leading edge 136a of cam plate 136, raised to a height determined by the slope of cam 136, deposited on the contiguous slope of conveyor leading edge, and raised thereby to the horizontal plane of conveyor belt 78. At the time the paper approaches the sloping, leading edge of the conveyor there is a limited relative motion of another kind between paper and belt. It is not a sliding motion but a very positive, yet gentle placement of conveyor belt 78 underneath the paper. Once the paper passes the area of this sloping portion of the conveyor belt there is no longer any appreciable relative motion since it is now on the substantially non-moving top surface. Therefore, the largest mass of paper being transferred is in a rest condition either on the top surface of the conveyor having just been transferred, or still on the stack waiting to be transferred.

The conveyor continues its aforementioned inward travel until it is automatically stopped having had the metered quantity of paper fully deposited on the top surface of the conveyor. The conveyor frame now travels outward of the stack by the reversal of motor 102, but since pawl 124 is now slipping on ratchet wheel 130, sprocket 134, keyed to ratchet wheel shaft 122, will turn freely with the outward motion of chain 116, as will conveyor belt 78. Thus, the "roll out" feature is cancelled and the conveyor moves out smoothly in a conventional manner by virtue of its rollers 80 riding on leg 58a of elevator channel 58.

A catcher rack 148, having an arcuate portion 150 and a horizontal portion 152, is located below the shuttle conveyor C1. The catcher rack 148 is secured to transverse angle brackets 158 which are, in turn rigidly fastened on the outside of elevator frame members 58 by means of straps 156. Advantageously, catcher rack 148 is provided with a suitable covering to protect the surface finish of spacer bars 142. Acting in cooperation with catcher rack 148 are a pair of endless belts 161–161' spaced on either side of belt 78 and extending parallel thereto. Belts 161–161' are trained at one end about enlarged diameters 77, integral with and proximate the opposing ends of trailing roller 76b. Belts 161–161', being relatively narrow, of the order of 2" wide, are also trained at their opposite end about rollers 79, freely rotatable on stub shafts 81 which are, in turn, journaled in frame members 74–74' (FIG. 7).

In operation, spaced belts 161–161' are carried into the stack with the motion of conveyor frame 74–74'. Their spacing is such that they pass beneath the end portions 144a of spacer bars 142. As hereinbefore noted, the motion of the top of conveyor 78 and hence belts 161–161', since they are also mounted on shaft 114, will be away from the stack in the loading area L as conveyor frame 74–74' moves in. Therefore, since the peripheral speed of belts 161–161' is greater than that of conveyor belt 78, spacer bars 142 in engagement with belts 161–161' at end portions 144a, will be rapidly pulled outward of the paper. Therefore, spacer bars 142 will traverse the length of belts 161–161' and fall therefrom onto the catcher rack 148 before conveyor 74–74' completes its "in" stroke. Catcher rack 148 is so located that an accumulation of spacer bars for future removal and reuse is quite convenient. FIG. 20 fragmentarily illustrates the relationship of the spacer bar take-off assembly components.

Reference is now made to FIGS. 10, 11 and 12 wherein there is shown means for resiliently coupling shuttle conveyor C1 and fixed conveyor C2 so that they move together to transfer the metered quantitiy of paper to cutting table S. At the end of its outward stroke, and after shuttle conveyor C1 has leveled itself with fixed conveyor C2 by means of appropriate switches controlling elevator E, spur gear 160, mounted on shaft 114 between conveyor frame 74' and elevator chanel 58 is brought into meshing engagement with spur gear 162, journaled for rotation within bracket 164 on shaft 166. Since an abrupt stop of shuttle conveyor C1 would tend to disrupt the paper carried thereon, gear 162 is provided with a resilient mounting. Said mounting comprises a U-shaped bracket 167, having depending from connecting leg 167a, a stud 168 adapted to pass through aperture 170 in the rear wall 164a of bracket 164. Biasing means in the form of a coil spring 172 encircle stud 168 between connecting leg 167a and rear wall 164a. One spaced leg 167b slides in guide slot 174 of leg 176a depending from bracket 164 and the other spaced leg 167c slides in guide slot 178 of cover plate 180 secured to bracket 164 by screws 182. Gear shaft 166 is journaled in bracket leg 176a and cover plate 180.

Fixed conveyor C2 comprises a pair of rolls 184 mounted on transverse shafts 186. Endless belt 188 encompasses rolls 184 and provides stationary conveyor means interposed between movable shuttle conveyor C1 and cutting table S. Motor 190 drives fixed conveyor C2 by means of sprockets 192 and 194 in cooperation with chain 196. Sprocket 194 is mounted on shaft 198, journaled in bracket legs 176a and 176b, both depending from bracket 164. Also mounted on shaft 198 is another sprocket 200 carrying chain 202. Sprocket 204, driven by chain 202, is mounted on gear shaft 166. Thus motor 190 will drive gear 160 through gear 162. This will impart a counterclockwise motion to shaft 114 and conveyor 78 so that the metered quantity of paper may be delivered to the cutter S.

Fixed conveyor C2 must run in the same direction as shuttle conveyor C1 so that it is therefore necessary to add reversing gears as shown in FIG. 11. Shaft 198 carries gear 206 which is in meshing engagement with reversing idler gear 208. Shaft 210, carrying gear 208, is journaled in bracket legs 176a and 176b and also rotatably carries sprocket 212 which, together with chain 214 and sprocket 216 mounted on one roller 186, drives fixed conveyor C2 in the same direction as shuttle C1. Motor 190 is started on signal from the operator when paper is needed on cutting table S in a manner to be described in connection with the electrical control means. The gearing between conveyors C1 and C2 are selected so that fixed conveyor C2 runs slightly faster than shuttle conveyor C1. If fixed conveyor C2 ran slower or even at the same speed as shuttle conveyor C1, there would be a tendency for the paper to bunch up transversely between its leading and trailing edges. The slightly higher speed of fixed conveyor C2 maintains the paper in its properly stretched out condition as is passes from shuttle conveyor C1 to the cutting table S.

*Slip-sheeting*

FIGS. 13, 14, 15, 16 and 17 illustrate various means for inexpensively incorporating a slip sheet feature without additional complex and cumbersome structures. For purposes of definition, "slip-sheet" as used herein refers to a marking means inserted in a desired position in the stack height between two adjacent sheets of paper. In each embodiment, the shuttle conveyor C1 first enters the stack, and upon leaving the stack, removes a spacer bar in the manner hereinbefore described. However, at the discretion of the operator, shuttle conveyor C1 may leave the stack by either using the roll-out method or not. If, when the conveyor is ready to leave the stack, the operator decides to electrically actuate pawl 126 into engagement with ratchet wheel 132, then the ratchet wheel will be held stationary, as will sprocket 134, and the belt will "roll-out" as before, but in an opposite direction. The result will be that of replacing on the stack the metered quantity of paper that had been cam lifted on the "in" stroke with the difference being that a marker has been inserted and a spacer bar removed. This represents a big advantage, permitting the placement of markers at various intervals over one entire sheet, where desired, without having to manually lift the paper to do so. The ream markers or other count indicators, useful in subsequent operations, may be accurately placed without stopping the machine or agitating the stack in any way.

One convenient slip-sheeting method is shown in FIG. 13 where strips of paper 218, colored or otherwise identifiable, are fastened to legs 146 of spacer bars 142, and are allowed to hang vertically therefrom. As shuttle conveyor C1 goes in, it will carry with the strips 218 (FIG. 14) and deposit them between two adjacent sheets of paper, specified by the location of the spacer bar. On the outward stroke, shuttle conveyor C1 is permitted to "roll-out," rather than move as a sliding platform with the strips 218 being retained in the stack, and with the spacer bar 142 removed. The elevator then moves down one spacer bar interval.

If it is then desired to pick up and transport the next lower stack then the bar at that level would not have a marker attached thereto. In the instance just described, the topmost stack would have had the spacer bar removed by the "in-out" action of the conveyor, the bar being replaced in the stack by strips 218. Then the stack second from the top would have contained therein the highest spacer bar which would be utilized to remove the top two stacks. If it is desired to mark an entire stack of paper by means of slip sheeting then each spacer bar 142 will have strips 218 affixed thereto. Usually however, two stacks are cut at one time so that it is necessary only to mark the boundary between stacks. FIG. 15 illustrates the placement of several strips at different levels.

Continuous and alternate slip-sheeting can be carried out automatically by the operator closing switch 360′ and 360, (FIG. 21) respectively. By placing switch 360 in "slip sheet on" position when light 363 is illuminated, proper phasing is assured. The ratcheting switch 362 is actuated on alternate operations by bar 318 (FIG. 4) to energize lamp 363. When switches 362a or 360′ are closed relays 364 and 368 are energized in turn lifting pawl 126 and opening the circuit through contacts 368a to prevent delivery of the load to the utilization means.

Figure 16:
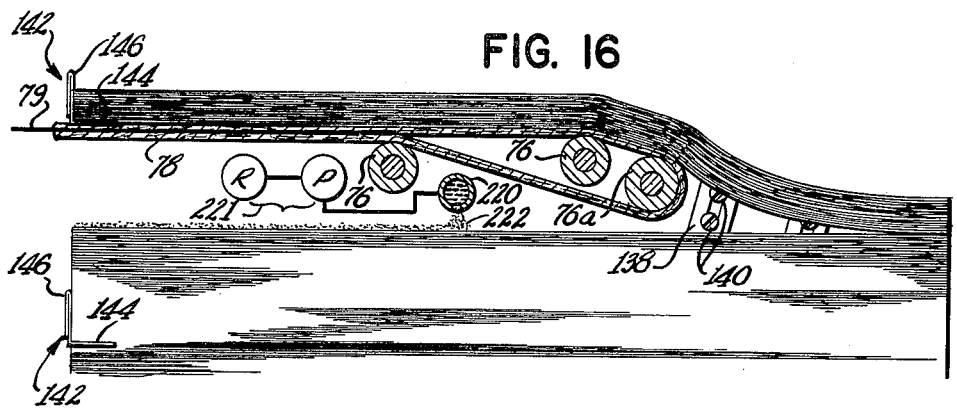
FIG. 16 is an alternative "slip-sheet" marker assembly method.

In FIG. 16, there is shown an alternative means for inserting slip sheet identifying spacers. In this embodiment a transverse pipe 220, having conventional supply and pumping means 221, sprays a coating of wax or colored liquid 222 to the topmost sheet beneath the spacer bar when it makes the "in" stroke. The "out" stroke is as before with respect to FIGS. 13 and 14, it being noted that the respective spacer bar is removed on the "in" stroke in the manner hereinbefore described.

Figure 17:
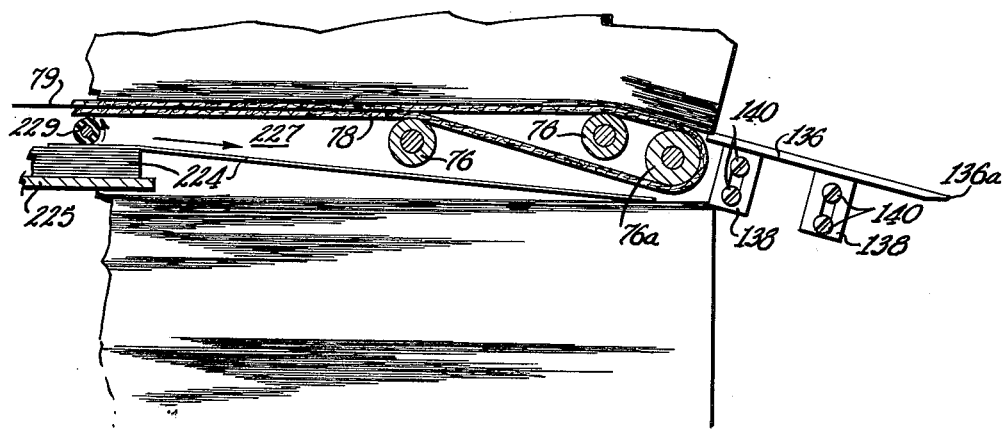
FIG. 17 is still another alternative "slip-sheet" marker assembly method.

FIG. 17 illustrates still another embodiment in which a stack of cardboard sheets 224, or the like, are carried on platform 225 nested within well 227 formed in the underside of conveyor belt 78. On the "in" stroke, one piece of cardboard 224 is fed onto the topmost sheet beneath the cam raised, metered quantity of paper and the conveyor is then rolled out. In order to so place the cardboard "slip-sheet," rubber wheel 229 engages the topmost cardboard sheet 224 which is resiliently biased upward. Well 227 is so located and the rotation of wheel 229 is so timed that at the end of the inward stroke of conveyor 78, when the metered quantity of paper is completely raised from the stack, cardboard sheet 224 will be fed.

The mobile control panel P (FIG. 2 and FIG. 3) for the implementation of all the various steps hereinbefore described is conveniently located so that all elements of the system and each step of the sequential operation may be under constant surveillance by a single operator. To achieve maximum mobility and maintain a clear area around the machine for personnel movement, the panel is conveniently pivotally mounted at the top of vertical support column 20, 22 or 24 and suspended therefrom. Stud 226, rotatably mounted in plate 228, supports platform 230 on which are mounted a pair of spaced U-shaped brackets 232. Two pairs of vertically spaced rollers 234 are rotatably secured between upright legs of bracket 232 for the purpose of slidably holding control panel support rod 236. As may be seen in FIGS. 1, 2 and 3, considerable mobility is provided the operator since the control panel may be moved in or out or swing in arcs of various sizes about pivot studs 226. It has been found convenient to provide a second control panel P1 at the cutter. This panel carries a duplicate set of switches connected in parallel with those of control panel P. The controls may be remotely located on a gallery from where one operator can observe and operate several machines.

The FIGS. 1–20 will now be used in conjunction with FIG. 21, a circuit diagram, to more fully disclose the cycle of operation.

In FIG. 21, the solenoids are shown in their deenergized condition with the shuttle conveyor assumed to be at the maximum "out" position adjacent to conveyor C2. On "start," the operator has his choice of manual or automatic operation. Assuming that the operator is loading a different size sheet than previously, he would set switch 301 to "MAN" (manual). Switches 301a and 301b are in series with emergency "off" switch 300 and power source 302. The operator can manually raise shuttle conveyor C1 to a desired vertical location by depressing "up" button 308 to close the circuit to motor 46. This gives him instantaneous control of the action of the elevator for precise position of the elevator. For different types of paper or different skids, it may be necessary for the operator to manually adjust the position of the sensing switch 310 by moving the switch support bracket along the slots 135a and locking by means of screws 135b.

Accordingly, the manual control is a convenient way for him to locate the conveyor elevator. In the manual operation mode holding coils 313, 315, 317 and 319 open their respective contacts to prevent automatic operation.

With the shuttle conveyor C1 now moving downwardly, the top bar is engaged by flexible feeler 310' of limit switch 310. When shuttle conveyor C1 reaches the proper level, as determined by the feeler 310' engaging the topmost bar, contacts 310a of switch 310 are opened thus disabling elevator motor 46 and contacts 310b are closed thus energizing motor 102 which controls the inward motion of shuttle conveyor C1. When switch contacts 310b are closed, holding relay 323 is energized closing switch contacts 323a to energize motor 102.

Manual switch 314 is provided for control of the inward motion of shuttle conveyor C1. Thus, whether manually or automatically operated, the conveyor now moves inwardly to pick up a stack of paper. As the conveyor is advanced into the stack, inward limit switch 316 is engaged by actuating bar 318 mounted on the conveyor frame 74, thus opening contacts 316a to de-energize the inward drive circuit. When switch 316 is actuated opening contacts 316a, contacts 316b are closed to energize holding relay 325 and energize motor 102 for outward travel of shuttle conveyor C1. Manual outward travel switch 327 is connected in parallel with contacts 316b. On its outward bound movement, shuttle conveyor C1 actuates switch 306 opening contacts 306b to disable motor 102. This also opens contacts 325a of holding relay 325. As contacts 306b are opened, contacts 306a are closed. At the same time, switch 330 is actuated to momentarily close its contacts. As momentary contact switch 330 is closed, coil 352 is energized and contacts 352a, 352b and 352c are closed. Relay 352 is now held in. Fork switch 332 is now energized through contacts 352b. When coil 352 is energized, time delay relay 329 is activated opening contacts 329a and 354. Fork switch 332 is now energized through contacts 352a. Depending upon the position of the sensing finger of switch 332, as determined by the direction of the last vertical movement of the conveyor-elevator, motor 46 will be energized for the proper one of "up" or "down" motions. The table will continue its vertical motion until it engages limit switch 334 so that its contacts will open and switch 334b will close when the table is centered level with the cutter bed.

Support column 20 (FIG. 3) carries maximum down limit switch 333a; maximum up limit switch 333, centering fork switch 332 and limit switch 334. The latter two switches are engaged by appropriately spaced cams 27' affixed to chain 27.

Whenever motor 46 is energized, relay 321 is also energized thus closing contact 321b energizing relay 331 which opens contact 331a to de-energize the "in" and "out" circuits controlling motor 102. It was pointed out earlier that during the loading operation, the ratchet wheel 130 and sprocket 134, which are keyed together, keep the top portion of the chain engaged in a fixed position. Therefore the bottom of the chain will roll out and into the stack of paper. In order to accomplish this it is necessary for pawl 124 to engage the ratchet wheel 130. Upon completion of the loading operation, and return to the complete "out" position, pawl 124 is disengaged from ratchet wheel 130 by the energization of solenoid coil 328.

When motor 102 is operating in the inward direction, coil 324 is energized opening contacts 324a thus de-energizing loading pawl solenoid 328, permitting loading pawl 124 to drop and engage ratchet wheel 130.

On the "out" stroke, with the ratchet unlocked, shuttle conveyor C1 moves away from the paper stack, with sprocket 134 freely rotating under the action of chain 116, permitting the entire chain to move past the roll out assembly 118. The conveyor now continues outwardly bound toward the utilization means.

A limit switch 338 is provided on the rear of the cutter bed and is actuated by the cutter gage so that the cutter gage must be in a rearward position and out of the path of the incoming paper load. Limit switch 338 is in series with motor 190.

*Alternate slip-sheet operation*

In series with switch 360, there is provided a ratchet type switch 362a–362b which activates a green signal light 363. This light is lit on every other inward travel of shuttle conveyor C1. If the operator wishes to slip-sheet, then at such times as the green light is on, he closes switch 360. On the next trip in, bar 318 on shuttle conveyor C1 closes switch 362a and opens switch 362b. Accordingly, relay 364 will be energized opening contacts 364a, de-energizing coil 370 and thus dropping unloading pawl 126 to engage ratchet wheel 132. At the same time, relay coil 368 is energized opening contacts 368a and closing contacts 368b.

As hereinbefore described, the chain 116 is held fixed on both "in" and "out" directions of shuttle conveyor C1 during "slip-sheeting." After inserting the slip-sheet marker, shuttle conveyor C1 is moved outwardly with chain 116 restrained by means of pawl 126 engaging ratchet wheel 132 and thus preventing rotation of keyed sprocket 134 which is in engagement with chain 116. When completely removed from the paper stack, the elevator mechanism lowers shuttle conveyor C1 to the next lower spacer bar 142 and either the slip-sheet or non-slip-sheet cycle is repeated.

FIGS. 22–27 illustrate the mechanical and electrical configuration of an alternative embodiment to the present invention. In many cases the utilization device, represented by cutting table S, has operating mechanism such as a fly wheel, motor, pulleys and belts or levers, located on the side proximate shuttle conveyor C1. In such instances, the fixed, bridging conveyor C2 must be provided intermediate the cutting table S and shuttle conveyor C1. Where such problems do not exist, and conveyor C2 is not required, the embodiment of FIGS. 22–27 may be advantageously utilized. In such an instance, elevator frame members 58 may abut cutting table S (FIG. 22). In order to have shuttle conveyor C1 traverse the additional distance formerly occupied by conveyor C2, it is necessary to have discontinuous chain 90 take a serpentine path. Starting with one end link 90a, affixed to block 94 by means of threaded stud 92, the path of chain 90 traverses sprockets 84 and 85. The chain continues to its terminal link 90b which is affixed to block 95 by means of stud 92. As before, chain 90 is driven by motor 102 at a time determined by the operator, in view of the requirements of the system. The effect of the serpentine chain path is to permit an extended horizontal travel of the conveyor 78 while still utilizing the supporting structure of the prior embodiment.

At the proper time for removing the metered quantity of paper from shuttle conveyor C1 for delivery to cutting table S, it is desirable to provide resilient engagement between gear 160 on conveyor frame 74' and gear 162 which is driven by motor 190. To achieve this, motor 190 is mounted on bracket 191 which pivotally supports rocker arm 193 on stud 195. Bracket 191 is secured to the underside of elevator frame member 58 proximate cutting table S (FIG. 23). Gear 162 is mounted in spaced arms 193a and 193b on shaft 197 at one end of said rocker arm. The opposite end of rocker arm 193 is provided with an idler sprocket 199 about which is trained chain 201, driven by motor 190, and still another sprocket 203, keyed to shaft 197. As the conveyor frame reaches the end of its horizontal stroke, proximate cutting table S, gear 160 rides over and meshes with gear 162 causing a slight counterclockwise rotation of rocker arm 193. Resilient biasing means in the form of compression spring 205 serves to maintain good meshing relation between gears 160 and 162. Spring 205 also serves to cushion the shock of engagement and thus prevents any disarrangement of the metered quantity of paper about to be transferred.

Figure 25:
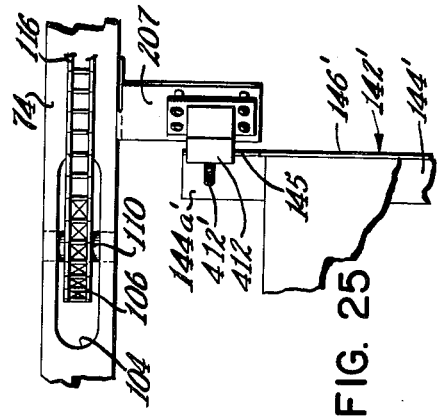
FIG. 25 is a partial plan view of the apparatus of FIG. 24 with parts omitted for clarity.
Figure 24:
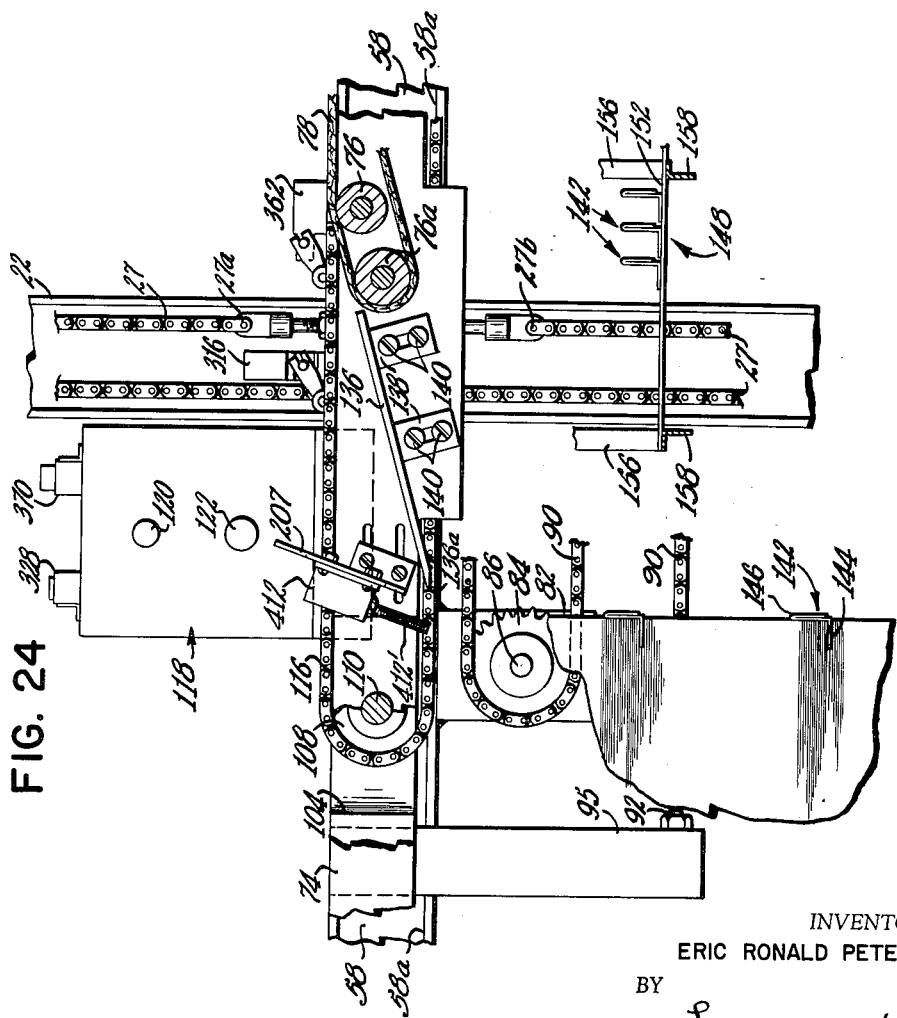
FIG. 24 is an elevational view similar to FIG. 4 illustrating shuttle conveyor drive means for an alternative embodiment of the present invention.

FIGS. 24 and 25 illustrate the mounting arrangement for the spacer bar detection means. Switch 412, comparable in function to switch 310 of the prior embodiment, is mounted on substantially vertical angle bracket 207 which is adjustably secured to shuttle frame member 74 by means of the screws and slots arrangement, as shown in FIG. 24. Additionally, switch 412 is adjustably mounted on angle bracket 207 by means of screws in slots. The end of spring finger feeler 412' of switch 412 is in alignment with both the end 144a' of spacer bar 142' and the leading edge 136a of cam plate 136. In this embodiment the elevator with the shuttle is brought down to the level of the topmost spacer bar and electrically stopped upon contact of switch spring finger feeler 412' with end 144a' of spacer bar 142'. To facilitate this movement, bar 142' is provided with a horizontal leg 144' and a vertical leg 146' which has a cut out portion 145 proximate one end 144a'. Thus even if switch 412 approaches the bar from above it will still contact the horizontal leg first. The shuttle (conveyor frame) 74–74' then starts its horizontal movement into the stack as before.

Reference will now be made to FIG. 26 wherein an alternative embodiment of the invention is shown. The control circuits and drive motors are connected to power source 302 through an emergency "off" switch 400. The apparatus is initially started by the closing of switch 402, connecting contacts 402a, to holding coil 404, which in turn closes contacts 404a to energize switch 406. Switch 406 provides a choice of "off," "manual," or "automatic" operation. Assuming switch 406 is set for automatic operation, the cycle may be initiated by pressing the "start" button 454. In turn, motor 102 is energized through switches 452, 454, 432, and relay contacts 420d and 463c for inward operation of the shuttle conveyor. If the elevator level sensing switch 450 is in the open position then contacts 420a are closed. If switch 450 is in the closed position, relay 420 closes contacts 420b. Thus, when switch 408 is closed, motor 46 is energized so as to drive the elevator in the proper vertical direction.

The closing of contacts 459b completes the circuit through contacts 458e permitting the release of switch 454 and motor 102 will continue driving the elevator inwardly towards the paper stack. The inward operation is continued until such time as switch 408, in the motor 46 "up-down" circuit, is closed. At the same time switch 408b is opened and switch 456a is closed.

Switch 413 in combination with switch 408 and pin 413' (408') on cam plate 415 (FIG. 28) assures that the conveyor moves vertically only when clear of the utilization device and the paper supply stack.

If at this time, the level of the paper on the skid is above the level of the elevator, a sensing means, shown as a switch 450, will be in a "circuit make" or closed condition. It is to be understood that other types of sensing means may be used for this purpose. It will be noted that when switch 450 is closed, coils 420 and 420c are energized thereby opening contacts 420a and 420d and closing contacts 420b. Thus "in" motor 102 is de-energized and the "up" motor 46 energized. Motor 46 is energized from switch 406, switch 452, switch 408, contacts 410a, switch 412, contacts 418a, 420b (which is now closed since relay coil 420 is energized) through switch 333, and contacts 428c. The elevator now rises until such time as switch 450 passes above the top of the paper stack permitting the sensing finger to be released, thereby opening the contacts of switch 450. This deactivates coil 420c and coil 420, opening contacts 420b, stopping the upward motion of the conveyor and closing contacts 420a and 420d to re-energize "in" motor 102 through switch 456a which is activated together with switch 408. The conveyor bed now moves about 4 inches towards the paper stack at which time switch 432a is closed and switch 432b is opened. When switch 432b opens, switch 432a closes activating the "down" portion of the "up-down" motor 46 through switches 406, 452, 408, 410a, 412, 432a, 426, 428b. The conveyor now travels down until such time as spring finger feeler 412' of switch 412 makes contact with the uppermost spacer bar inserted in the forward portion of the skid of paper. Switch contacts 412 are closed when switch contacts 412b are open and vice versa. The opening of switch contacts 412a stops the "down" motion while the closing of switch contacts 412b in the "in" circuit activates coil 460. When coil 460 is activated, contacts 460a and 460b close. Closing of contacts 460b energizes motor 102 to drive the elevator in an "in" direction through switch 452 through contacts 458e across contacts 460b (which are now closed) completing the circuit, across contacts 463c to "in" motor 102. The "in" motor now drives the conveyor into the stack to pick up the load of paper. It travels in until such time as limit switch 316a is opened. This deactivates the motor 102 preventing further "in" movement of the shuttle, and also prevents the "up-down" motor 46 from running. At the same time, switch 316b is closed completing the circuit through contacts 463b for "out" direction operation of the shuttle by motor 102. Simultaneously, holding coil 468 is energized closing contacts 468b completing the circuit, through switches 446b, 456b and 466a, across 463b to the "out" drive circuit of motor 102. The motor now continues to drive the conveyor outwardly until such time as switch 446b is opened deactivating the "out" motor 102. At the same time switch 470 closes completing the circuit to switches 446b and 334b. Thus, the closing of switch 446a on the return to center of the "up-down" portion of the cycle energizes coil 410b and coil 410. Coil 410 opens contacts 410a; coil 410b closes contacts 410c and 410d. At this time switch 448, which is a single pole double-throw switch, will be in either the "A" position or the "B" position. Initially, if the elevator traveled downwardly switch 448 would be in the "A" position; if the elevator had first traveled upwardly, switch 448 would be in the "B" position. Upon the closing of switch 446a and the closing of 410c, switch 448 is energized and the circuit will be completed through switch 426 across 428b to energize motor 46 for "down" side movement of the elevator. The conveyor shuttle now travels down to return to the level of the cutter bed. Limit switch 334a is engaged and opens when the elevator reaches this level disabling the circuit from switch 408 through contacts 458c, through switches 334a and 446a, across contacts 410c, through switch 448 (contact B), through switch 426, across contacts 428b to the "down" drive windings of motor 46. As switch 334 opens, switch 334b closes thereby re-energizing motor 102. It will be noted that as switch 446b opens, switch 470 is simultaneously closed. With switches 334b and 470 in their closed condition, the circuit is completed, either across contacts 418c or through contacts 456b, through switch 466a, across contacts 463b to energize motor 102 so as to drive the shuttle away from the supply stack. The shuttle moves horizontally towards the cutter until such time as switch 466a is engaged and opened, thus deactivating the motor 102. If, at this time, the gage of the cutter is positioned at the rearmost point on the cutter deck, then limit switch 338 has been closed. With these two switches (338 and 466b) closed, it is possible for the operator, by pressing button 476, to manually activate conveyor belt drive motor 190. At this time coil 482 is energized making contacts 482b close. Run switch 476 may now be released as the circuit to motor 190 is completed through switch 472, contacts 458i and 482b, switches 338 and 466b.

The conveyor drive will continue to run until such time as either stop switch 472 is pressed, the gage is pulled away from switch 338, or until the motor on the "in" circuit is activated, moving the elevator causing the cam to release switch 466.

*Manual mode*

Placing switch 406 in the "manual" position will activate coils 458 and consequently open contacts 458a. It will also energize coil 458b thereby opening contacts 458c, activate coil 458d which opens contacts 458e, activate coils 458f which opens contacts 458g, and also activate coils 458h thus opening contacts 458i. When any of these coils (458, 458b, 458f and 458h) are activated and the respective contacts are open, the "manual up" switch 414, "manual down" switch 430, "manual in" switch 454, "manual out" switch 464, or "run" switch 476, must be held manually for any of the motors to run in the aforementioned directions. These switches are shown on the switch panel P.

*Slipsheet operation*

Should it be desired to slipsheet at this time, switch 360 is set in the "on" or "slipsheet" position when green light 363 is lit, activating the line through to switch 362a. At this point, the normal operation is then started by pressing the cycle "start" button. The conveyor then travels inwardly in the automatic mode described earlier. The conveyor travels in all the way until such time as switch 360 is activated closing contacts 362a opening contacts 362b.

When contacts 362b open, the light goes out. When contacts 362a are closed, coil 418c is activated dropping pawl 126 and coil 418b in the outward motor drive circuit is activated opening contacts 418c. In turn, coil 418 is activated opening contacts 418a.

As the elevator travels outwardly from the paper supply it is stopped when it reaches switch 456 which is engaged by a projecting cam 456 on the cam plate 415 and opens it to stop the "out" direction operation of motor 102. Concurrently, switch contacts 432a are closed to start the "down" direction operation of motor 46. The motor 46 now lowers the elevator until such time as switch 412 comes in contact with the uppermost spacer bar 142 in the pile of paper again interrupting the "down" motion circuit. Simultaneously, switch 412 opens the "up-down" circuit and closes switch 412b in the "in" circuit. This activates coil 460 closing contacts. The machine is now ready to repeat its inward bound trip, again opening 362a and closing 362b, as mentioned before, thereby completing the normal operating cycle before returning to a center position.

This system can be extended to either make one or more additional trips per cycle in slipsheeting. In this event, a stepping switch having additional steps would replace two-step switch 362.

In the "in-out" circuit, there is provided coils 428 and 428a. These coils operate contacts 428b and 428c. Whenever motor 102 is running, either in the "in" or "out" direction, contacts 428c and 428b are opened. In the same manner, there is operated coils 463 and coils 463a energized from the "up-down" circuits opening contacts 463b, 463c whenever the "up-down" motor is running. The opening of the latter contacts will deactivate motor 102.

In the "up-down" circuit, there are provided coils 422 and 424. Whenever the machine is run in the "down" direction, holding coil 424 is energized maintaining contacts 424a closed, completing the circuit (from switch 406) so as to energize motor 46 for "down" motion of the elevator. In the same manner, when the elevator is driven up, coil 422 is energized closing contacts 422a. This latter action completes a circuit through contacts 420a to energize motor 46 for "up" direction motion of the elevator. These coils will not hold in when coil 458 is activated and contacts 458a are opened. Accordingly, upon the opening of any of the limit switches, the motor will stop. Likewise the coils 422 will not hold in at any time when contacts 420a are open or a limit switch is opened to break a circuit.

There has thus been provided an efficient means for transferring a load of paper from a skid to a cutting table, said transferral taking place in an automatic incremental manner. Means have heretofore been described for accomplishing this in such a way as to avoid damage to costly and delicate paper sheets. Additionally, the apparatus described permit accurate funtioning of the various components even when said components are attended by only a single operator. Both the mental and physical burdens are reduced to the bare minimum, it being necessary only to make decisions as to when to start the machine, and when to transfer the metered quantity of paper to the cutting table. Simple means for a "slip sheeting" operation have been provided that permits a wide range of use when so desired. An extremely simple, yet effective device for indicating the quantities of paper to be transferred has been povided which together with means for their removal permit transferral of discrete quantities of paper without the necessity of lifting portions from the main stack.

There has been disclosed heretofore the best embodiment of the invention presently contemplated and it is to be understood that various changes and modifications may be made by those skilled in the art without departing from the spirit of the invention.

What is claimed is:

1. An apparatus for transferring a pile of nonrigid sheets from a supply stack to a utilization means, the supply stack having at least one spacer bar disposed in and extending fully across the leading edge of the stack, the spacer bar being wider than the stack and having end portions arranged to overhang the sides of the stack, said apparatus comprising:
   (a) an elevator and means to drive said elevator vertically along a fixed vertical axis;
   (b) shuttle means including a frame, an endless circulatable web having upper and lower surfaces and fore and aft transverse support means journaled in said frame between said upper and lower web surfaces, said shuttle means being carried by and horizontally movable with respect to said elevator means;
   (c) means adapted to alternately drive said shuttle means into and out of the stack;
   (d) means to hold said upper web surface fixed against horizontal movement relative to said elevator means on an instroke of said shuttle means whereby said lower web surface moves in advance of said upper web surface, said holding means being disengageable on the next outstroke of said shuttle means whereby said upper and lower web surfaces move horizontally towards the utilization means at substantially the same speed;
   (e) a cam member secured on each side of said shuttle means for movement therewith, said cam members being arranged to engage and lift the outer overhanging spacer bar ends in advance of said shuttle means whereby the entire leading edge of the pile of sheets to be transferred is uniformly lifted in a horizontal plane to permit said shuttle means to enter the stack, said lower web surface, moving in advance of said upper web surface, being thereby placed underneath in intimate contact with and in support of the spacer bar and the entire undersurface of the pile of sheets to be transferred; and
   (f) means to unload the transferred pile of sheets from said shuttle means into the utilization means.

2. The apparatus of claim 1 including means to remove the spacer bar from between said upper web surface and the pile of sheets being transferred during an outstroke of said shuttle means.

3. The apparatus of claim 1 including means to remove the spacer bar during an outstroke of said shuttle means, said removal means comprising an endless driven belt disposed on each side of said shuttle means, the longitudinal axes of said belts being coincidental with the overhanging spacer bar ends, means adapted to move said belts at a higher speed than that at which said shuttle means moves horizontally whereby the spacer bars will be pulled from underneath the pile of sheets being transferred and will drop off the end of said shuttle means before said shuttle means reaches the utilization means.

4. The apparatus of claim 1 including means to concurrently remove the spacer bar from the stack and to hold said upper web surface fixed on an outstroke of said shuttle means whereby the pile of sheets to be transferred is replaced on the top of the stack in its original position without the spacer bar.

5. The apparatus of claim 1 including marker means and means to insert one of said markers beneath the sheet resting on the spacer bar on an instroke of said shuttle means and means to concurrently remove the spacer bar from the stack and to hold said upper web surface fixed on the next outstroke of said shuttle means whereby the spacer bar is replaced by said marking means and the pile of sheets to be transferred is replaced on the top of the stack in its original position.

6. The apparatus of claim 1 including means to move said upper web surface faster than the remainder of said shuttle means whereby a slight pulling force is imparted to the paper to be transferred to thereby maintain the sheet stretched out.

7. The apparatus of claim 1 including means to stop said elevator when said cams are at the proper level to engage and lift the spacer bar, means to stop the horizontal movement of said shuttle means at the end of the instroke and outstroke thereof and means to sense the level of said shuttle means with respect to the utilization means, said level sensing means being operatively connected to said elevator driving means to control same whereby, after said shuttle means receives the pile of sheets to be transferred, said elevator means drives said shuttle means vertically to the level of the utilization means.

8. The apparatus of claim 1 wherein said unloading means comprises an endless conveyor belt having an upper surface at the same level as and in close proximity to the utilization means and means adapted to drive the upper surface of said conveyor belt in the direction of the utilization means when said shuttle means and said conveyor belt are at the same height and said shuttle means is at the end of the outstroke.

9. The apparatus of claim 1 wherein said unloading means comprises a drive motor, a first gear secured to one of said transverse support means of said shuttle means and a second gear mounted for engagement with said first gear when said shuttle means is in juxtaposition with the utilization device, said second gear being driven by said drive motor whereby said upper web surface is moved in the direction of the utilization means.

10. The apparatus of claim 9 wherein said second gear is arranged for resilient engagement to said first gear.

11. The apparatus of claim 1 wherein said holding means comprises first and second sprockets rotatably journaled in said shuttle means proximate each end thereof, a link chain trained about said sprockets, a third sprocket in meshing engagement with said link chain and means to lock said third sprocket against rotation.

12. The apparatus of claim 11 wherein said locking means are responsive to an electrical signal.

13. The apparatus of claim 11 wherein said locking means comprise at least one pawl and ratchet wheel combination, said ratchet wheel being coaxially mounted with and keyed to said third sprocket, said pawl being engageable and disengageable from said ratchet wheel.

14. The apparatus of claim 1 including means for preventing simultaneous horizontal motion of said shuttle means and vertical motion of said elevator.

15. The apparatus of claim 1 wherein said elevator comprises a plurality of spaced side support members disposed vertically on either side of said shuttle means and a pair of spaced elevator frame members horizontally disposed intermediate said support members and said shuttle means, said elevator frame members being movable only in the vertical direction, said shuttle means being supported by and horizontally movable with respect to said elevator frame members.

16. The apparatus of claim 1 wherein said transverse support means are rollers horizontally guided in said elevator anad wherein said web encircles said rollers, said web thereby having a substantially flat upper surface and a downwardly sloping leading edge, said cams and said leading edge being at substantially the same angle.

References Cited by the Examiner

UNITED STATES PATENTS

| | | |
|---|---|---|
| 2,886,190 | 5/59 | Beaulieu. |
| 3,017,041 | 1/62 | Hawkes _____ 214—8.5 |
| 3,047,095 | 7/62 | Bell _____ 214—8.5 X |
| 3,055,516 | 9/62 | Mead _____ 214—8.5 |
| 3,095,193 | 6/63 | Sorenson. |
| 3,105,598 | 10/63 | Magnuson _____ 214—8.5 |
| 3,146,897 | 9/64 | Curtenius. |

GERALD M. FORLENZA, *Primary Examiner.*

MORRIS TEMIN, *Examiner.*